United States Patent
Luo et al.

(10) Patent No.: US 11,609,418 B2
(45) Date of Patent: Mar. 21, 2023

(54) OPTICAL EYEPIECE USING SINGLE-SIDED PATTERNING OF GRATING COUPLERS

(71) Applicant: Magic Leap, Inc., Plantation, FL (US)

(72) Inventors: Kang Luo, Austin, TX (US); Vikramjit Singh, Pflugerville, TX (US); Nai-Wen Pi, Plano, TX (US); Shuqiang Yang, Austin, TX (US); Frank Y. Xu, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/246,936

(22) Filed: May 3, 2021

(65) Prior Publication Data
US 2021/0271070 A1 Sep. 2, 2021

Related U.S. Application Data

(63) Continuation of application No. 16/898,723, filed on Jun. 11, 2020, now Pat. No. 11,022,790.

(60) Provisional application No. 62/861,646, filed on Jun. 14, 2019.

(51) Int. Cl.
*G02B 25/00* (2006.01)
*G02B 6/293* (2006.01)

(52) U.S. Cl.
CPC ......... *G02B 25/001* (2013.01); *G02B 6/2935* (2013.01); *G02B 6/29334* (2013.01); *G02B 6/29329* (2013.01)

(58) Field of Classification Search
CPC  G02B 25/001; G02B 6/29334; G02B 6/2935; G02B 6/29329
See application file for complete search history.

(56) References Cited

U.S. PATENT DOCUMENTS

| | | | |
|---|---|---|---|
| 8,160,411 B2 | 4/2012 | Levola et al. | |
| 8,320,032 B2* | 11/2012 | Levola | G02B 27/0081 359/13 |
| 8,508,848 B2* | 8/2013 | Saarikko | G02B 5/1814 359/567 |
| 10,038,840 B2* | 7/2018 | Vallius | H04N 5/23293 |
| 10,073,267 B2 | 9/2018 | TeKolste et al. | |
| 10,095,045 B2* | 10/2018 | Robbins | G02B 27/4261 |

(Continued)

FOREIGN PATENT DOCUMENTS

| | | |
|---|---|---|
| CN | 104718479 A | 6/2015 |
| CN | 107209365 A | 9/2017 |
| TW | 200706934 A | 2/2007 |

OTHER PUBLICATIONS

Office Action in Chinese Appln. No. 202080043479.0, dated Jun. 29, 2022, 14 pages (with English translation).

(Continued)

*Primary Examiner* — Ellen E Kim
(74) *Attorney, Agent, or Firm* — Fish & Richardson P.C.

(57) ABSTRACT

An eyepiece includes a substrate and an in-coupling grating patterned on a single side of the substrate. A first grating coupler is patterned on the single side of the substrate and has a first grating pattern. The first grating coupler is optically coupled to the in-coupling grating. A second grating coupler is patterned on the single side of the substrate adjacent to the first grating coupler. The second grating coupler has a second grating pattern different from the first grating pattern. The second grating coupler is optically coupled to the in-coupling grating.

18 Claims, 17 Drawing Sheets

(56) References Cited

U.S. PATENT DOCUMENTS

| | | | |
|---|---|---|---|
| 10,534,115 B1 | 1/2020 | Calafiore et al. | |
| 2010/0321781 A1* | 12/2010 | Levola | G02B 27/4272 |
| | | | 359/569 |
| 2011/0096401 A1* | 4/2011 | Levola | G02B 6/0016 |
| | | | 359/573 |
| 2013/0314789 A1* | 11/2013 | Saarikko | G02B 27/42 |
| | | | 359/558 |
| 2016/0116739 A1* | 4/2016 | TeKolste | G02B 6/0076 |
| | | | 385/36 |
| 2017/0059879 A1 | 3/2017 | Vallius | |
| 2017/0370919 A1 | 12/2017 | Hart | |
| 2018/0113313 A1 | 4/2018 | Tekolste et al. | |
| 2018/0275350 A1* | 9/2018 | Oh | G02B 27/0093 |
| 2019/0086674 A1 | 3/2019 | Sinay et al. | |
| 2019/0227316 A1 | 7/2019 | Lee et al. | |
| 2020/0026074 A1* | 1/2020 | Waldern | G02B 27/0081 |
| 2020/0209630 A1 | 7/2020 | Schultz et al. | |
| 2020/0393666 A1 | 12/2020 | Luo et al. | |

OTHER PUBLICATIONS

PCT Invitation to Pay Additional Fees in International Appln. No. PCT/US2020/037280, dated Aug. 27, 2020, 2 pages.

PCT International Search Report and Written Opinion in International Appln. No. PCT/US2020/037280, dated Oct. 21, 2020, 11 pages.

* cited by examiner

OPTICAL EYEPIECE USING SINGLE-SIDED PATTERNING OF GRATING COUPLERS

CROSS-REFERENCE TO RELATED APPLICATIONS

This application is a continuation of U.S. application Ser. No. 16/898,723, filed on Jun. 11, 2020, which claims the benefit of U.S. Provisional Application 62/861,646, filed on Jun. 14, 2019, both of which are incorporated herein by reference in their entirety.

TECHNICAL FIELD

This disclosure relates to an optical eyepiece using single-sided patterning of grating couplers.

BACKGROUND

Imprint lithography can be used to fabricate nanometer-scale patterns on wafers. Imprint lithography creates patterns by mechanical deformation of imprint resist and subsequent processes. However, eyepieces fabricated using imprint lithography can have a limited field of view. Light must generally travel a long distance to reach an exit pupil expander of the eyepiece. As the light travels along the long distance, coherent artifacts are worsened. Moreover, the double-sided lithography traditionally used to manufacture eyepieces increases the fabrication complexity and can decrease manufacturing yield and throughput.

SUMMARY

Innovative aspects of the subject matter described in this specification include an optical eyepiece using patterning of grating couplers. The eyepiece includes a substrate and an in-coupling grating patterned on a single side of the substrate. A first grating coupler is patterned on the single side of the substrate and has a first grating pattern. The first grating coupler is optically coupled to the in-coupling grating. A second grating coupler is patterned on the single side of the substrate adjacent to the first grating coupler. The second grating coupler has a second grating pattern different from the first grating pattern. The second grating coupler is optically coupled to the in-coupling grating.

Innovative aspects of the subject matter described in this specification further include an eyepiece including an in-coupling grating patterned on a single side of a substrate. The in-coupling grating is configured to diffract light received from a projector into a first portion of the light and a second portion of the light. The first portion has a first orientation with respect to the light received from the projector. The second portion has a second orientation with respect to the light received from the projector. The second orientation is different from the first orientation. A diffraction grating is patterned on the single side of the substrate. The diffraction grating is configured to receive, from the in-coupling grating, the first portion of the light and the second portion of the light. Each of the first portion of the light and the second portion of the light are diffracted. The diffracted first portion of the light and the diffracted second portion of the light are combined.

Innovative aspects of the subject matter described in this specification further include an eyepiece including an in-coupling grating imprinted on a single side of a substrate. A grating coupler is imprinted on the single side of the substrate. The grating coupler is optically coupled to the in-coupling grating. The grating coupler includes multiple tiles defining an exit pupil expander (EPE) of the eyepiece. Each tile of the multiple tiles has a first grating pattern. A grating region is interspersed between the tiles. The grating region has a second grating pattern different from the first grating pattern. The grating region defines an orthogonal pupil expander (OPE) of the eyepiece.

Innovative aspects of the subject matter described in this specification further include an eyepiece including a substrate having a refractive index greater than a threshold value An in-coupling grating is patterned on a single side of the substrate. Three or more grating couplers are patterned on the single side of the substrate. The three or more grating couplers are optically coupled to the in-coupling grating. Each grating coupler of the three or more grating couplers has a different grating pattern.

Innovative aspects of the subject matter described in this specification further include an eyepiece including an in-coupling grating patterned on a first side of a substrate having a refractive index greater than a threshold value or on a second side of the substrate. A first grating coupler is patterned on the first side of the substrate. The first grating coupler has a first grating pattern. The first grating coupler is optically coupled to the in-coupling grating. A second grating coupler is patterned on the second side of the substrate. The second grating coupler has a second grating pattern different from the first grating pattern. The second grating coupler is optically coupled to the in-coupling grating.

Among other benefits and advantages, the embodiments disclosed herein increase the field of view, efficiency, and uniformity of optical eyepieces for virtual reality and augmented reality applications. Each eyepiece can include two or more diffraction gratings patterned on the same side of a substrate. The two or more diffraction gratings can be tiled in layout. The shape, size, density, and distribution of the tiles can be selected to achieve a higher optical performance. Moreover, the embodiments reduce the amount of Mach-Zehnder interference. Because the tiles can be as small as several hundred microns, the far field virtual image quality is not affected. The single-sided manufacturing of the eyepiece increases the user-to-world ratio of the eyepiece. A larger amount of light is directed towards the eyeball of the user because the nano gratings are blazed or made of high-refractive-index materials such as polymers having a refractive index greater than 1.6. In some embodiments, the gratings are etched in high-refractive-index glass including $TiO_2$, $ZrO_2$, or ZnO. In some embodiments, the gratings are etched in synthetic, high-index substrates such as $LiNbO_3$, $LiTaO_3$, or SiC. In some embodiments, the gratings are etched in $TiO_2$ thin film coatings or other inorganic materials to provide further optical benefits. The layout of the tiles within the grating couplers can be altered to achieve a higher uniformity of the far field virtual image. The sharpness of the resulting image is also increased. In some embodiments, the size of each tile can be kept the same while the tile density is decreased from denser to more sparse. Eyepieces can thereby be designed having a preferred diffraction direction. The diffracted light that is directly coupled to an eyeball of a user of the eyepiece is reduced while increasing the efficiency of diffraction in other directions. The diffraction properties of the gratings can be further improved using slanting and blazing of protrusions, or multi-stepped protrusions or recesses. The different design choices provided by the embodiments disclosed herein therefore provide higher optical efficiency and quality.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

This document describes the design and manufacture of an eyepiece using patterning of an in-coupling grating and grating couplers. The eyepiece can be an optical eyepiece such as used in a virtual reality or augmented reality application. The eyepiece includes a substrate and an in-coupling grating patterned on a single side of the substrate. The in-coupling grating receives light from a projector. A first grating coupler is patterned on the single side of the substrate. The first grating coupler has a first grating pattern. The first grating coupler is optically coupled to the in-coupling grating. A second grating coupler is patterned on the single side of the substrate adjacent to the first grating coupler. The second grating coupler has a second grating pattern different from the first grating pattern. The second grating coupler is optically coupled to the in-coupling grating.

Among others, the benefits and advantages of the embodiments disclosed herein include patterning the diffraction gratings on a single side of the substrate, such that the eyepiece reduces the need for the light to travel a longer distance to reach the EPE. The efficiency of the light exiting the eyepiece towards the user is improved; coherent artifacts are thereby reduced and a larger field of view with improved uniformity is realized within an otherwise small-area form factor. Moreover, the fabrication complexity is reduced by maintaining the relief pattern on a single side of the eyepiece, and the manufacturing yield and throughput are increased.

Imprint Lithography System

Figure 1A:
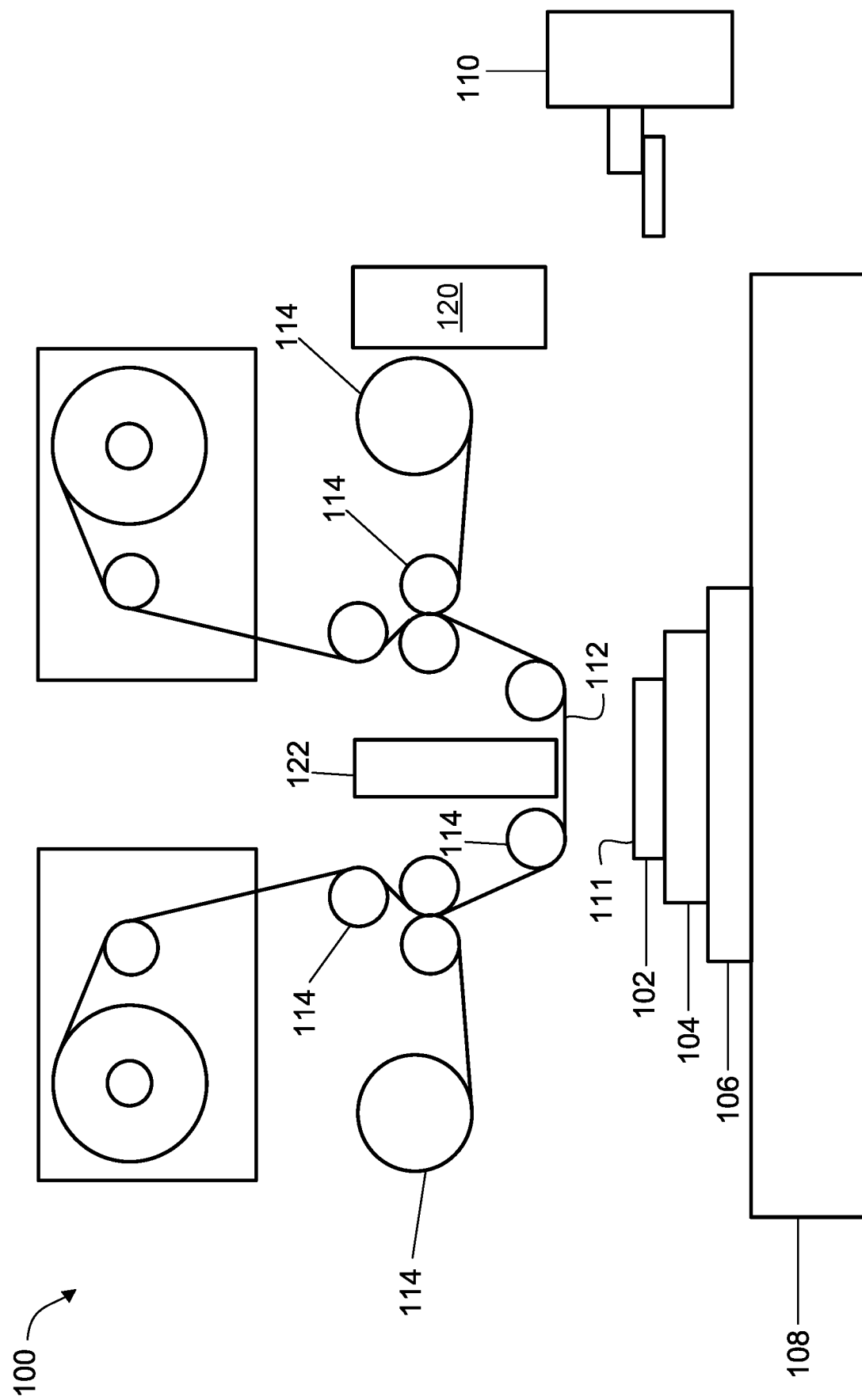
FIG. 1A illustrates a side view of an imprint lithography system 100 that forms a relief pattern on a substrate.

FIG. 1A illustrates an imprint lithography system 100 that forms a relief pattern on a substrate 102. The substrate 102 may be coupled to a substrate chuck 104. In some embodiments, the substrate chuck 104 includes a vacuum chuck, a pin-type chuck, a groove-type chuck, an electromagnetic chuck, and/or the like. In some embodiments, the substrate 102 and the substrate chuck 104 are further positioned on an air bearing 106. The air bearing 106 provides motion about the x-, y-, and/or z-axes. In some embodiments, the substrate 102 and the substrate chuck 104 are positioned on a base. The air bearing 106, the substrate 102, and the substrate chuck 104 can also be positioned on a stage 108. In some embodiments, a robotic system 110 positions the substrate 102 on the substrate chuck 104.

The imprint lithography system 100 further includes an imprint lithography flexible coated resist template 112 that is coupled to one or more rollers 114, depending on design considerations. The rollers 114 provide movement of a least a portion of the flexible coated resist template 112. Such movement may selectively provide different portions of the flexible coated resist template 112 in superimposition with the substrate 102. In some embodiments, the flexible coated resist template 112 includes a patterning surface that includes multiple features, e.g., spaced-apart recesses and protrusions. Other configurations of features are also possible. The patterning surface may define any original pattern that defines the basis of a pattern to be formed on substrate 102. In some embodiments, the flexible coated resist template 112 is coupled to a template chuck, e.g., a vacuum chuck, a pin-type chuck, a groove-type chuck, or an electromagnetic chuck.

The imprint lithography system 100 may further include a fluid dispenser 120. The fluid dispenser 120 may be used to deposit a polymerizable material on the substrate 102. The polymerizable material may be positioned upon the substrate 102 using techniques such as drop dispense, spin-coating, dip coating, chemical vapor deposition, physical vapor deposition, thin film deposition, or thick film deposition. In some embodiments, the polymerizable material is positioned upon the substrate 102 as multiple curable resist droplets.

Substrate Having Patterned Layer Positioned Thereon

Figure 1B:
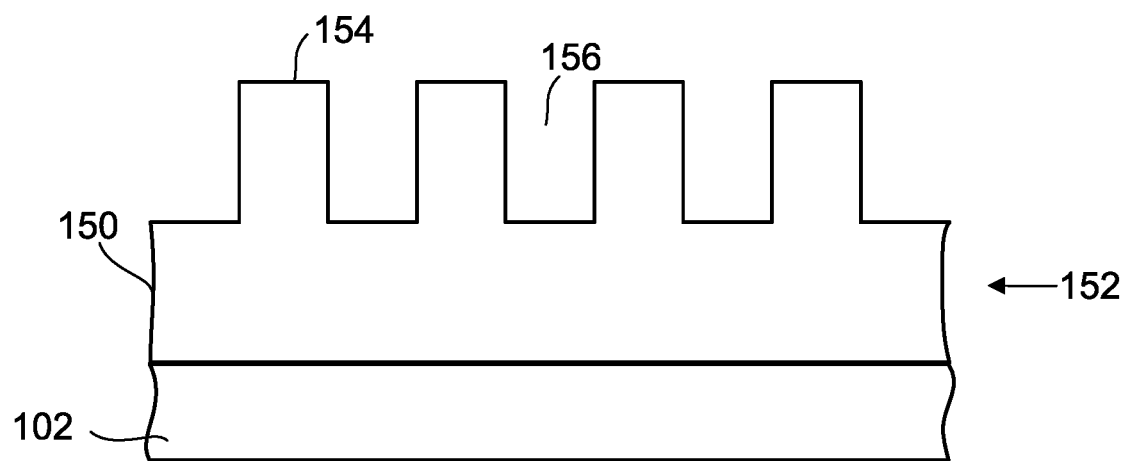
FIG. 1B illustrates a side view of a substrate having a patterned layer positioned thereon.

FIG. 1B illustrates a side view of a substrate 102 having a patterned layer 150 positioned thereon. Referring to FIGS. 1A and 1B, the imprint lithography system 100 may further include an energy source 122 coupled to direct energy (e.g., broadband ultraviolet radiation) towards the substrate 102.

In some embodiments, the rollers 114 and the air bearing 106 are configured to position a desired portion of the flexible coated resist template 112 and the substrate 102 in a desired positioning. The imprint lithography system 100 may be regulated by a controller in communication with the air bearing 106, the rollers 114, the fluid dispenser 120, and/or the energy source 122, and may operate on a computer readable program stored in a memory.

In some embodiments, the rollers 114, the air bearing 106, or both, vary a distance between the flexible coated resist template 112 and the substrate 102 to define a desired volume therebetween that is filled by the polymerizable material. For example, the flexible coated resist template 112 contacts the polymerizable material. After the desired volume is filled by the polymerizable material, the energy source 122 produces energy, e.g., broadband ultraviolet radiation, causing the polymerizable material to solidify and/or cross-link, conforming to a shape of a surface of the substrate 102 and a portion of the patterning surface of the flexible coated resist template 122, thus defining a patterned layer 150 on the substrate 102. In some embodiments, the patterned layer 150 includes a residual layer 152 and multiple features shown as protrusions 154 and recessions 156.

System for Manufacturing Optical Waveguide on Substrate

Figure 2:
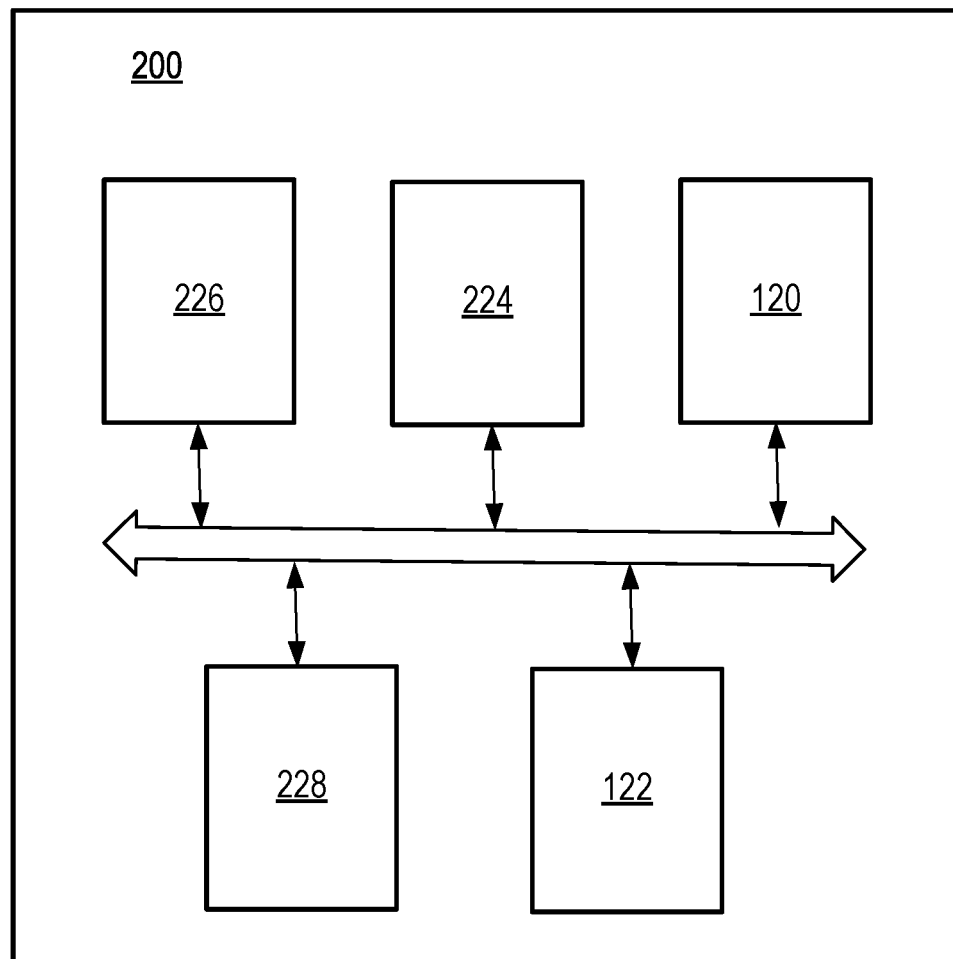
FIG. 2 illustrates a system for manufacturing an optical waveguide on a substrate.

FIG. 2 illustrates a system 200 for manufacturing an optical waveguide on a substrate. The system 200 includes a vapor deposition system 226, a controller 224, a fluid dispenser 120, a laser source 228, and an energy source 122. The system 200 may be used to manufacture a multi-waveguide optical structure, including multiple waveguides stacked to intercept light passing sequentially through each waveguide, each waveguide associated with a differing color and a differing depth of plane.

The vapor deposition system 226 is configured to deposit an adhesion promoting layer on the substrate (e.g., 102). The adhesion promoting layer is intended to improve the adhesion of the curable resist droplets to the substrate 102. For example, the adhesion promoting layer may be applied by spinning a diluted solution on to the substrate 102 and allowing the layer to spin dry.

The imprint lithography system 200 may be regulated by a controller 224 in communication with the vapor deposition system 226, the fluid dispenser 120, the laser source 228, and/or the energy source 122, and may operate on a computer readable program stored in a memory. The controller 224 may be implemented in software or hardware. For example, the controller 224 may be part of a PC, a tablet PC, a smartphone, an internet of things (IoT) appliance, or any machine capable of executing instructions that specify actions to be taken by that machine.

The controller 224 may instantiate void fiducials in the optical structure being manufactured to monitor the dispensing of the curable resist droplets within an optical eyepiece layer. Void fiducials or fiducial markers are markers that may be placed in the field of view of the optical structure produced, for use as a point of reference or a measure. The void fiducials may be placed into or on the imaging subject or a mark or set of marks in an optical instrument.

The controller 224 may superimpose a coated resist template (e.g., 112) onto the curable resist droplets to contact and pattern the curable resist droplets. The coated resist template 112 includes a patterning surface including multiple recesses and protrusions. The coated resist template 112 may further include deep grating structures or dams configured to prevent the curable resist droplets from flowing into a zero RLT region. The controller 224 may further direct broadband ultraviolet radiation from an energy source 122 to cure the curable resist droplets. The controller 224 may further remove the coated resist template 112 to expose the patterned resist, which then conforms to a portion of the patterning surface of the coated resist template 112.

The controller 224 may etch diffraction gratings formed on the optical structure to define an optical eyepiece layer. In some embodiments, the need to dry etch the substrate 102 (e.g., dry etch high-index glass or sapphire) is abrogated. In some embodiments, the substrate 102 is partially etched (e.g., a plasma process under atmospheric or low pressure conditions) to remove a residual layer and/or transfer the pattern into the substrate 102, while maintaining a portion of the residual layer on a surface of the substrate 102.

The diffraction gratings diffract light traveling through the optical waveguide. The controller 224 may further direct a laser beam from the laser source 228 onto a portion of the adhesion promoting layer to incise the substrate 102. The controller 224 may incise the optical eyepiece layer from the substrate 102 by pulsing the laser beam onto the portion of the adhesion promoting layer to generate nanoperforations in the substrate 102. The laser beam is applied to the generated nanoperforations to expand the nanoperforations and separate the optical eyepiece layer from the substrate 102. While the resist may be removed by laser ablation in some embodiments, in other embodiments it may simply not be placed down (e.g., by masking) or etched off (e.g., by plasma) or any combination thereof. The controller 224 may further bond the optical eyepiece layer to another optical eyepiece layer imprinted on another substrate to define the optical waveguide.

The fluid dispenser 120 dispenses a thin layer of imprint resist (e.g., thermoplastic polymer) in the form of curable droplets onto the substrate 102. In some embodiments, the fluid dispenser 120 is configured to dispense the curable resist droplets on the adhesion promoting layer to define diffraction gratings. The adhesion promoting layer is disposed between and contacts the substrate 102 and the dispensed curable resist droplets. A region defining an optical eyepiece layer has an edge, wherein the edge of the optical eyepiece layer is free of the curable resist droplets.

In some embodiments, the fluid dispenser 120 is configured to dispense the curable resist droplets on the adhesion promoting layer by injecting the curable resist droplets on the adhesion promoting layer at predefined coordinates and a predefined frequency. Adjacent droplets of the curable resist droplets are caused to have a predefined separation on the adhesion promoting layer. For example, the fluid dispenser 120 may be programmed to indicate areas where the resist is or is not to be dispensed. A very high resolution resist drop pattern may be created including predefined coordinates for individual resist droplets and a predefined XY pitch between adjacent droplets. The fluid dispenser 120 operates at a very high frequency while dispensing the resist droplets while the substrate 102 is pass under the inkjet heads. Ultra-high resolution and precision (X, Y, volume) are achieved by the inkjet dispense frequency, head voltage, and stage movement control. The curable resist droplets may be injected on the adhesion promoting layer by moving the inkjet heads of the fluid dispenser 120, moving the substrate across the inkjet heads of the fluid dispenser 120, or moving the inkjet heads of the fluid dispenser 120 and the substrate across each other.

In some embodiments, the fluid dispenser 120 is further configured to maintain the zero RLT region corresponding to the edge of the optical eyepiece layer free of the curable resist droplets. This configuration increases optical performance of the optical waveguide by reducing scattering of light at the edge of the optical eyepiece layer and reducing a number of particle defects on the zero RLT region of the optical waveguide.

The laser source 228 provides the laser beam to incise the substrate 102. In some embodiments, the laser source 228 includes a gain medium, an energizing mechanism, and an optical feedback mechanism. The gain medium is a material with properties that allow it to amplify light by way of stimulated emission. The energy may be supplied as an electric current or as light at a different wavelength. The laser source 228 may use feedback from an optical cavity, and may affect properties of the emitted light, such as the polarization, wavelength, and shape of the beam.

The energy source 122 provides radiation to strengthen (e.g., polymerize or cross-link) the resist droplets leaving behind a resist coating on the substrate. In some embodiments, the energy source 122 decreases the wavelength of the radiation to achieve higher resolution. For example, the energy source 122 may provide energy at wavelengths in the ultraviolet spectrum or shorter (<400 nm), the deep ultraviolet spectrum, etc. In some embodiments, the energy source 122 produces electron beams, achieving the same results as exposure by light.

Environment of Eyepiece Using Patterning of Grating Couplers

Figure 3A:
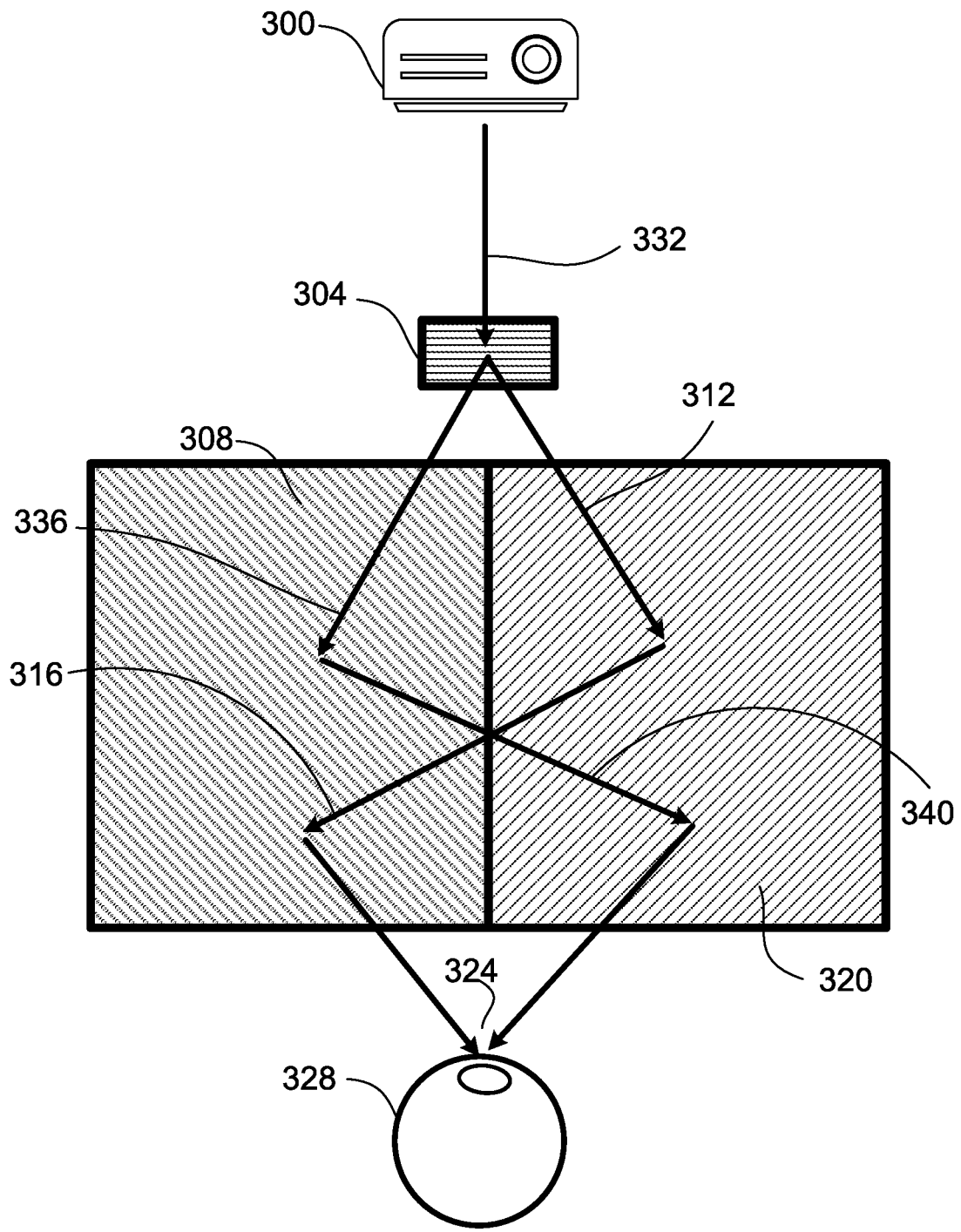
FIG. 3A illustrates an operational environment of an optical eyepiece.

FIG. 3A illustrates an operational environment of an optical eyepiece. The eyepiece shown in FIG. 3A includes a substrate (e.g., the substrate 400 illustrated and described below with reference to FIG. 4). The substrate can have a refractive index greater than a threshold value. In some embodiments, the refractive index of the substrate is greater than 1.4. The refractive index or index of refraction of the substrate is a dimensionless number that describes how fast light propagates through the substrate. The substrate can be made of a high-refractive-index polymer or glass. In some embodiments, the gratings include a thin layer of low-index material patterned over a high-index substrate or etched in high-refractive-index glass including $TiO_2$, $ZrO_2$, or ZnO. In some embodiments, the gratings are etched in a synthetic, high-index substrate such as $LiNbO_3$, $LiTaO_3$, or SiC. In some embodiments, the gratings are etched in $TiO_2$ thin film coatings or other inorganic materials to provide further optical benefits.

The eyepiece shown in FIG. 3A includes an in-coupling grating 304 patterned on a single side of the substrate. The in-coupling grating 304 in FIG. 3A is located at an eyebrow of a user using the eyepiece, or located at a temple of the user. The in-coupling grating 304 couples rays of light 332 from a light source projector 300 into the first grating coupler 308 and the second grating coupler 320 using a combination of total internal reflection and diffraction.

The in-coupling grating 304 is configured to diffract the light 332 received from the projector 300. The light 332 is diffracted and coupled into a first portion 336 of the light and a second portion 312 of the light. The first portion 336 has a first orientation with respect to the light 332 received from the projector 300 and the second portion 312 has a second orientation with respect to the light 332 received from the projector 300. The second orientation is different from the first orientation. For example, the first portion 336 can be oriented in a first direction and the second portion 312 can be oriented in a second direction. The in-coupling grating 304 is further configured to direct the first portion 336 to the first grating coupler 308. The in-coupling grating 304 is further configured to direct the second portion 312 to the second grating coupler 320. The eyepiece is split vertically into the first grating coupler 308 and the second grating coupler 320 as shown in FIG. 3A when the in-coupling grating 304 is located at an eyebrow or a cheek of the user. The vertical frame of reference is in a direction from forehead to chin of a user of the eyepiece. If the in-coupling grating 304 is located at a temple or a nostril of the user, the eyepiece can be split horizontally. The horizontal frame of reference is in a direction from ear to ear of a user of the eyepiece.

The first grating coupler 308 is optically coupled to the in-coupling grating 304 to receive the portion 336 of light diffracted by the in-coupling grating 304. The first grating coupler 308 is patterned on the single side of the substrate and has a first grating pattern. The first grating pattern can include ridges, rulings, linear grating segments, protrusions, recesses, or a combination thereof, as illustrated and described in detail below with reference to FIGS. 6A-D, 7A-B, 8A-B, 9A-B, 10 and 11A-B. The first grating coupler 308 is configured to diffract the first portion 336 of the light received from the in-coupling grating 304. The first grating coupler 308 has a periodic structure or pattern that splits and further diffracts the portion 336 of light into several beams travelling in different directions. The different directions of the beams depend on the spacing of the grating and the wavelength of the light such that the grating acts as a dispersive element. The first grating coupler 308 directs the diffracted first portion 340 of the light to the second grating coupler 320. In some embodiments, the first grating coupler 308 defines an OPE of the eyepiece. The OPE spreads the diffracted rays of light using total internal reflection (TIR) in different directions.

The second grating coupler 320 is optically coupled to the in-coupling grating 304. In some embodiments, the second grating coupler 320 defines an EPE of the eyepiece. The EPE couples the light exiting the OPE towards the user of the eyepiece or the world. In some embodiments, the combination of the OPE and EPE functioning in tandem is referred to as a Combined Pupil Expander (CPE).

The second grating coupler 320 is patterned on the single side of the substrate and is adjacent to the first grating coupler 308. The second grating coupler 320 has a second grating pattern different from the first grating pattern. The second grating pattern can include ridges, rulings, linear grating segments, protrusions, recesses, or a combination thereof, as illustrated and described in detail below with reference to FIGS. 6A-D, 7A-B, 8A-B, 9A-B, 10 and 11A-B. The second grating coupler 320 is configured to diffract the second portion 312 of the light. The diffracted second portion 316 of the light is directed to the first grating coupler 308. The eyepiece is configured to combine the diffracted first portion 340 and the diffracted second portion 316. The eyepiece is further configured to direct the combined light 324 to an eyeball 328 of a user of the eyepiece. The first grating coupler 308 and the second grating coupler 320 illustrated in FIG. 3A are sometimes referred to as having a split honeycomb pattern or a split honeycomb configuration.

In some embodiments, the in-coupling grating 304 includes a first set of parallel ridges or rulings oriented in a first direction as shown in FIG. 3A. The first set of ridges, rulings, or linear grating segments can be spaced apart by a first pitch distance. The first grating coupler 308 includes a second set of parallel ridges or rulings oriented in a second direction different from the first direction. The second set of ridges, rulings, or linear grating segments can be spaced apart by a second pitch distance. The second grating coupler 320 can include a third set of parallel ridges or rulings oriented in a third direction different from the first direction and the second direction. The third set of ridges, rulings, or linear grating segments can be spaced apart by a third pitch distance. An angle between the second direction and the third direction is in a range from 55 degrees to 65 degrees.

The lengths of the paths of the portions of light 336 and 312 shown in FIG. 3A can be designed such that the two portions 336 and 312 are either in phase or out of phase. Similarly, the lengths of the paths of the portions of light 316 and 340 can be designed such that the two portions 336 and 312 are either in phase or out of phase. The embodiments thus modulate the phase of the light field of the OPE and EPE. The modulation of the phase of the light field mitigates the Mach-Zehnder interference and improves the uniformity of the resulting image. The sharpness of the resulting image is also increased. Moreover, the embodiments illustrated in FIG. 3A provide increased optical efficiency. In traditional eyepieces, a large amount of the light is diffracted into the air, thus reducing efficiency. In contrast, in the eyepiece of FIG. 3A, the portion 312 of the light in the second grating coupler will not diffract out of the eyepiece and instead reaches the first grating coupler 308. Thus, more of the light is conserved and optical efficiency is increased. The eyepiece illustrated in FIG. 3A also improves the spreading of the light in single-layer architectures. By including specific nano-features in the design, the eyepiece can pipe two or more wavelengths of light into a single layer and improve the image quality.

Patterning of In-Coupling Grating and Grating Couplers in Optical Eyepiece

Figure 3B:
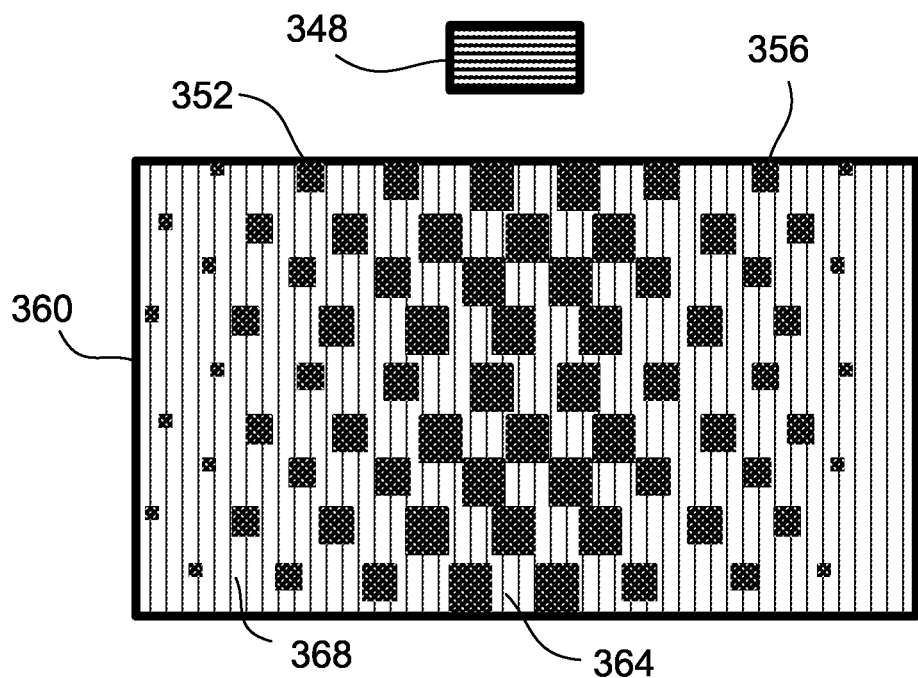
FIG. 3B illustrates patterning of an in-coupling grating and grating couplers in an optical eyepiece.

FIG. 3B illustrates patterning of an in-coupling grating 348 and grating couplers 356 and 368 in an optical eyepiece. In other embodiments, the eyepiece includes additional or fewer objects than those described herein. The eyepiece shown in FIG. 3B includes a substrate (e.g., the substrate 400 illustrated and described below with reference to FIG. 4) and an in-coupling grating 348 imprinted on a single side of the substrate, similar to the in-coupling grating 304 shown in FIG. 3A. A first grating coupler 356 is imprinted on the single side of the substrate and optically coupled to the in-coupling grating 348. The first grating coupler 356 includes multiple tiles defining an EPE of the eyepiece. Each tile 352 of the first grating coupler 356 has a first grating pattern. The first grating pattern can include ridges, rulings, linear grating segments, protrusions, recesses, or a combination thereof. The first grating coupler 356 is configured to receive a portion of light diffracted by the in-coupling grating 348 and further diffract the portion of light using the tiles.

A second grating coupler (the grating region 368) is interspersed between the tiles. The grating region 368 has a second grating pattern (parallel ridges or rulings) different from the first grating pattern. The grating region 368 defines an OPE of the eyepiece. In some embodiments, the in-coupling grating 348 includes a first set of parallel ridges as shown in FIG. 3B. The grating region 368 includes a second set of parallel ridges orthogonal to the first set of parallel ridges. The grating region 368 is configured to receive another portion of light diffracted by the in-coupling grating 348 and further diffract the other portion of light. The first grating coupler 356 is thereby configured to reduce a brightness of light emitted by a center region 364 of the grating region 368. The grating couplers in FIG. 3B receive light diffracted by the in-coupling grating 348 and diffuse light emitted by the center region 364 of the grating region 368.

The single-sided eyepiece, wherein the in-coupling grating 348, the first grating coupler 356, and the grating region 368 are imprinted on a single side of the substrate, provides a larger field of view as well as reduced coherent artifacts. Coherent artifacts refer to destructive and constructive interference of diffracted light rays exiting the eyepiece. Such artifacts can cause regions of dark and bright patches in an image projected into a user's field of view. Coherent artifacts can cause a reduction in image and color uniformity. The embodiments disclosed herein improve the image and color uniformity by reducing the coherent artifacts. The configuration illustrated in FIG. 3B is sometimes referred to as a tiled snowflake grating pattern or a tiled snowflake grating configuration.

In some embodiments, an area or a size of each tile 352 of the multiple tiles decreases as a position of the tile 352 changes from the center region 364 of the grating coupler 356 to a boundary 360 of the grating coupler 364. The change in the area or the size of each tile 352 reduces the brightness of the light emitted by the center region 364. Because the tiles are as small as several hundred microns, the far field virtual image quality is not affected. Moreover, the single-sided nature of the eyepiece increases the user-to-world ratio of the eyepiece. A larger amount of light is directed towards the eyeball 328 of the user because the nano gratings are blazed or made of high-refractive-index materials such as polymers having a refractive index greater than 1.6. Furthermore, the gratings can be etched in high-refractive-index glass including $TiO_2$, $ZrO_2$, or $ZnO$. In some embodiments, the gratings are etched in synthetic, high-index substrates such as $LiNbO_3$, $LiTaO_3$, or SiC. In some embodiments, the gratings are etched in $ZrO_2$, $TiO_2$, or SiC thin film coatings.

In some embodiments, the tiles of the grating coupler 356 have a rectangular shape. The size of each tile 352 as well as the length of a side of the tile 352 can vary from the boundary 360 to the center region 364. In some embodiments, the tiles of the grating coupler 356 have a circular shape. The diameter of each tile 352 can vary from the boundary 360 to the center region 364. In some embodiments, the tiles of the grating coupler 356 have an elliptical shape. The dimensions of each tile 352 can vary from the boundary 360 to the center region 364. In some embodiments, the tiles of the grating coupler 356 have a polygonal shape. The polygon can be a regular polygon or an irregular polygon. For example, the tiles can have a hexagonal shape.

In some embodiments, each tile 352 of the multiple tiles shown in FIG. 3B includes multiple protrusions, as illustrated and described in detail below with reference to FIGS. 6A-D. The protrusions are sometimes referred to as pillars, grating pillars, or pillar gratings. The grating coupler 356 is sometimes referred to as a pillar diffraction grating. Each protrusion of the multiple protrusions has one or more sidewalls, as illustrated and described in below with reference to FIG. 6A. Each sidewall of the one or more sidewalls can be oriented at a different angle to the substrate. For example a gradient of each sidewall with respect to the substrate can be different. In some embodiments, each protrusion of the multiple protrusions includes two intersecting ridges oriented in two different directions. The position at which the two intersecting ridges meet defines the protrusion.

Patterning of In-Coupling Grating and Grating Couplers in Optical Eyepiece

Figure 4:
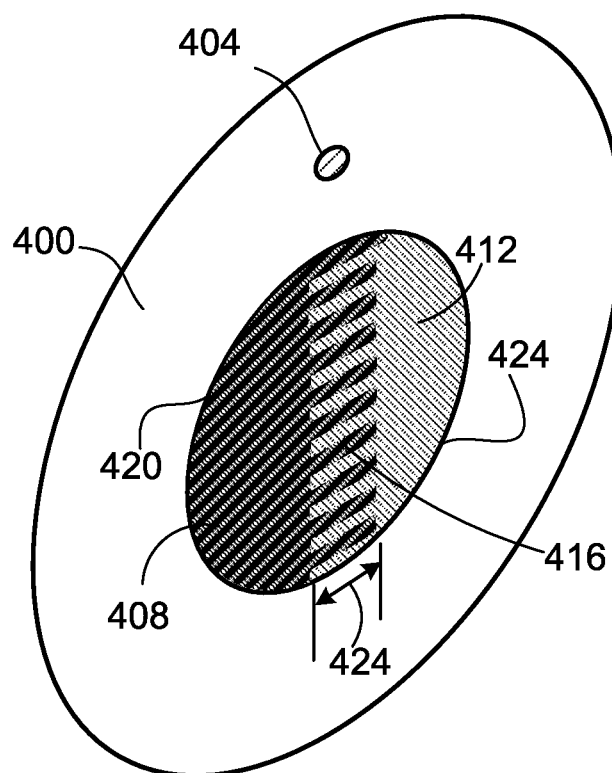
FIG. 4 illustrates patterning of an in-coupling grating and grating couplers in an optical eyepiece.

FIG. 4 illustrates patterning of an in-coupling grating 404 and grating couplers in an optical eyepiece. The eyepiece shown in FIG. 4 includes a substrate 400 that can have a refractive index greater than a threshold value. In some embodiments, the refractive index of the substrate is greater than 1.4. The substrate 400 is described in greater detail above with reference to FIGS. 1A, 1B, 2, and 3A. The in-coupling grating 404 can be patterned on a first side of the substrate 400, a second side of the substrate 400, or both sides of the substrate 400. A first grating coupler 420 is patterned on the first side of the substrate 400. The first grating coupler 420 has a first grating pattern 408. For example, the first grating pattern 408 can include a periodic arrangement of ridges, rulings, linear grating segments, protrusions, recesses, or a combination thereof. In some embodiments, the first grating coupler 420 includes a first set of ridges oriented in a first direction. The first grating coupler 420 is optically coupled to the in-coupling grating 404 to receive a first portion of light from the in-coupling grating 404.

In some embodiments, a second grating coupler 424 is patterned on the first side of the substrate 400. Both the first grating coupler 420 and the second grating coupler 424 are thus patterned on the same side of the substrate 400. The second grating coupler 424 has a second grating pattern 412 different from the first grating pattern 408. For example, the second grating pattern 412 can include a periodic arrangement of ridges, rulings, linear grating segments, protrusions, recesses, or a combination thereof. In some embodiments, the second grating coupler 424 includes a second set of ridges oriented in a second direction that is different from the first direction. In some embodiments, an angle between the first direction and the second direction is in a range from 55 degrees to 65 degrees. The second grating coupler 424 is optically coupled to the in-coupling grating 404, such that the second grating coupler 424 is configured to receive a second portion of light from the in-coupling grating 404.

In some embodiments, the second grating coupler 424 is patterned on the second side of the substrate 400. The first grating coupler 420 and the second grating coupler 424 are thus patterned on different sides of the substrate 400. The second grating coupler 424 has a second grating pattern 412 different from the first grating pattern 408. For example, the second grating pattern 412 can include a periodic arrangement of ridges, rulings, linear grating segments, protrusions, recesses, or a combination thereof. In some embodiments, the second grating coupler 424 includes a second set of ridges oriented in a second direction that is different from the first direction. In some embodiments, an angle between the first direction and the second direction is in a range from 55 degrees to 65 degrees. The second grating coupler 424 is optically coupled to the in-coupling grating 404, such that the second grating coupler 424 is configured to receive a second portion of light from the in-coupling grating 404.

In some embodiments, an area 416 or a region of the first grating coupler 420 overlaps an area or a region of the second grating coupler 424. The overlapped area 416 diffracts light into the eyeball 328 of a user of the eyepiece. In some embodiments, the area 416 of the first grating coupler 420 overlaps the second grating coupler 424 such that the overlapped area 416 is configured to diffract a portion of light into the eyeball 328 of a user of the eyepiece. The overlapped area 416 decreases a brightness of the light that is directly diffracted into the eyeball 328 of the user, such that the user does not see a bright central band in the image displayed by the eyepiece. In some embodiments, a size of the area 416 of the first grating coupler is in a range from 10% to 60% of a total area of the first grating coupler 420. In some embodiments, a width 424 of the overlapped area 416 (corresponding to a width of an eyebox of the eyepiece) is in a range from 5 mm to 20 mm. In some embodiments, the dimensions of the eyebox are 15 mm in the horizontal direction and 18 mm in the vertical direction. The vertical frame of reference is in a direction from forehead to chin of a user of the eyepiece. The horizontal frame of reference is in a direction from ear to ear of a user of the eyepiece. The eyebox is an area within the eyepiece (EPE/CPE) through which the exiting light rays are meant to capture a range of the movement and positioning of the eyeball 328 within a field of view of one or more users as defined by the eyepiece where the eyepiece is fixed at a particular distance from the user's eye.

Grating Patterns in Optical Eyepiece

Figure 5A:
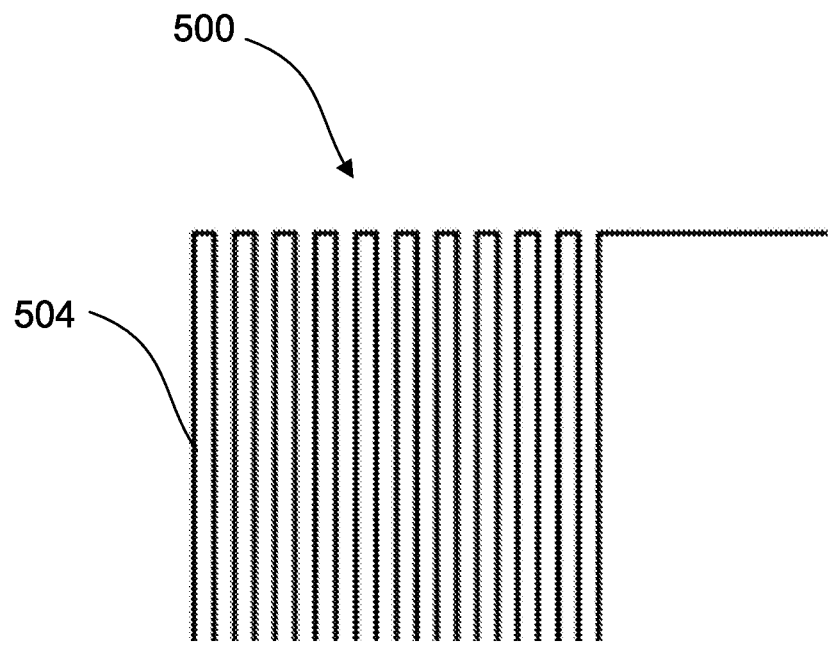
FIG. 5A illustrates an interdigitated grating pattern in an optical eyepiece.

FIG. 5A illustrates an interdigitated grating pattern 500 in an optical eyepiece. The eyepiece includes a first grating coupler (e.g., the first grating coupler 308 illustrated and described above with reference to FIG. 3A) patterned on a single side of a substrate. The first grating coupler has a first grating pattern. For example, the first grating coupler can include a first set of ridges oriented in a first direction, as shown above in FIG. 3A. A second grating coupler (e.g., the second grating coupler 320 illustrated and described above with reference to FIG. 3A) is patterned on the single side of the substrate. The second grating coupler has a second pattern different from the first pattern. For example, the second grating coupler can include a second set of ridges oriented in a second direction, as shown above in FIG. 3A. Referring now to FIG. 5A, the first grating coupler contacts the second grating coupler, defining the interdigitated alternating pattern 500 at the locations of contact. The interdigitated alternating pattern 500 diffuses light that is directly diffracted into the eyeball 328 of a user of the eyepiece. In some embodiments, the interdigitated alternating pattern 500 includes multiple parallel ridges 504 oriented in a particular direction. In other embodiments, the interdigitated alternating pattern 500 includes alternating bands of the first pattern and the second pattern.

Figure 5B:
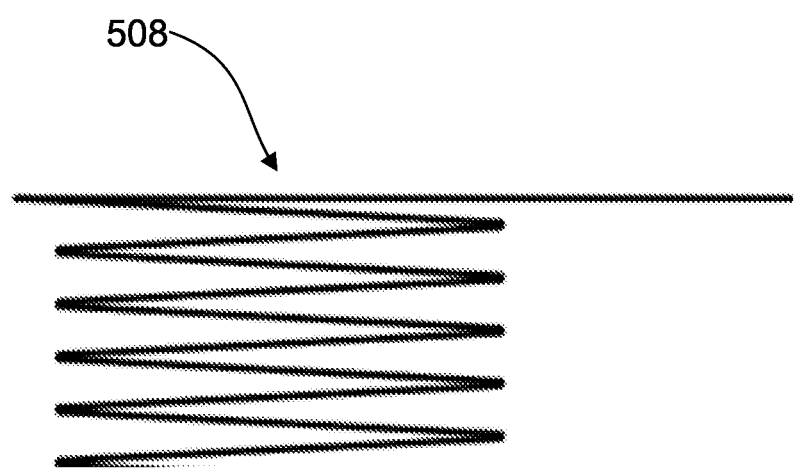
FIG. 5B illustrates a sawtooth grating pattern in an optical eyepiece.

FIG. 5B illustrates a sawtooth grating pattern 508 in an optical eyepiece. In the embodiments illustrated in FIG. 5B an interdigitated alternating pattern is defined including multiple ridges arranged in the sawtooth pattern 508. The sawtooth pattern 508 reduces a brightness of light that is directly diffracted into the eyeball 328 of the user. Therefore, the user does not see a bright central band in the image displayed by the eyepiece.

Figure 5C:
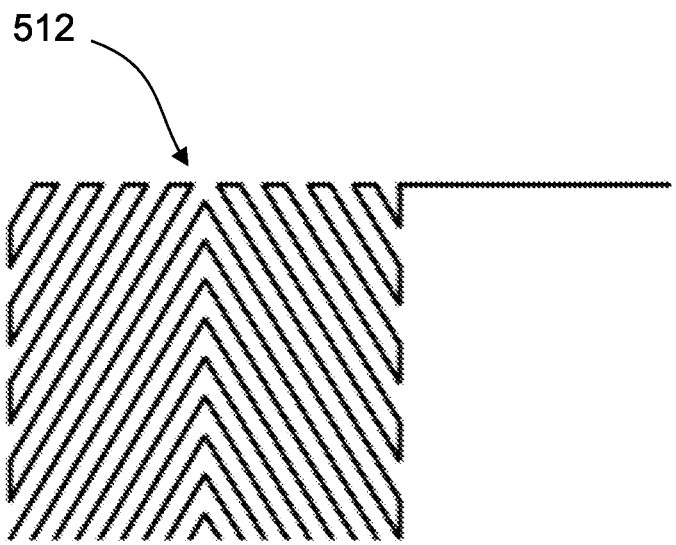
FIG. 5C illustrates a Chevron grating pattern in an optical eyepiece.

FIG. 5C illustrates a Chevron grating pattern 512 in an optical eyepiece. The pattern illustrated in FIG. 5C includes multiple ridges arranged in a Chevron grating pattern 512. A Chevron grating pattern is a V-shaped pattern that includes substantially equal areas or regions of a first grating pattern of a first grating coupler (e.g., the first grating coupler 308 illustrated and described above with reference to FIG. 3A) and a second grating pattern of a second grating coupler (e.g., the second grating coupler 320). An angle between ridges of the first grating pattern and ridges of the second grating pattern is in a range from 55 degrees to 65 degrees.

Figure 5D:
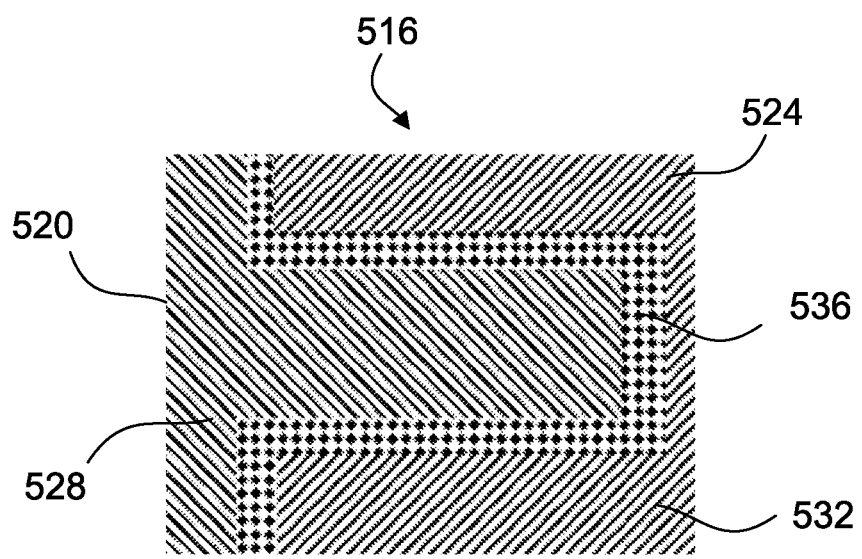
FIG. 5D illustrates a stencil used in an optical eyepiece.

FIG. 5D illustrates a stencil 516 used in an optical eyepiece. The stencil 516 defines an interdigitated alternating pattern between a first grating coupler 520 and a second grating coupler 524. The first grating coupler 520 is patterned using a first set of parallel ridges 528 oriented in a first direction. The second grating coupler 524 is patterned using a second set of parallel ridges 532 oriented in a second direction different from the first direction. The stencil 516 thereby blends a first boundary of the first grating coupler 520 with a second boundary of the second grating coupler 524.

In some embodiments, an interdigitated alternating grating pattern in the stencil 516 includes multiple protrusions 536. Each protrusion is defined by two intersecting ridges, one each from the ridges 528 and 532. Each protrusion of the multiple protrusions 536 can have one or more sidewalls. Each sidewall of the one or more sidewalls can be oriented at a different angle to the substrate (e.g., the substrate 400 illustrated and described above with reference to FIG. 4). In some embodiments, the multiple protrusions 536 have a refractive index greater than 1.4.

Diamond-Patterned Protrusions in Grating Coupler

Figure 6A:
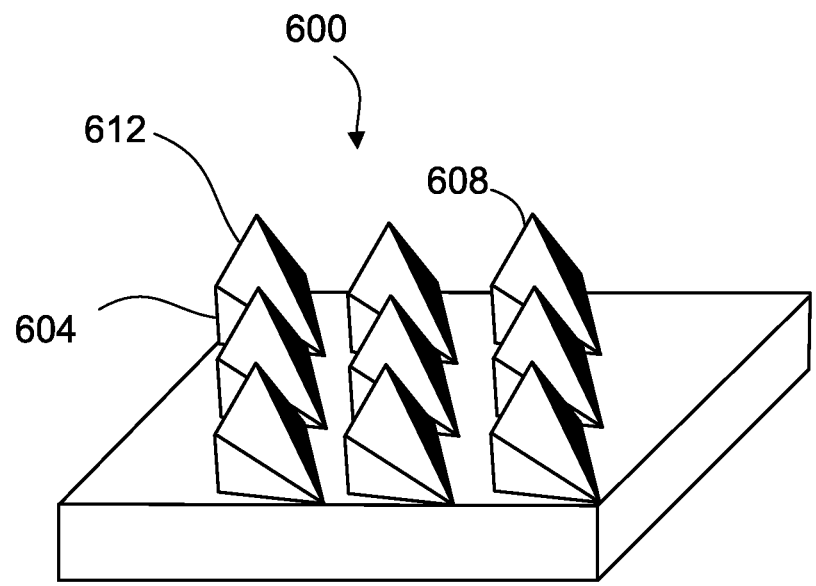
FIG. 6A illustrates diamond-patterned protrusions in a grating coupler in an optical eyepiece.

FIG. 6A illustrates diamond-patterned protrusions in a grating coupler 600 in an optical eyepiece. The grating couplers 600, 624, 648, and 674 illustrated in FIGS. 6A-D are also sometimes referred to as having a blazed pillar pattern, a blazed pillar configuration, a blazed protrusion pattern, or a blazed protrusion configuration. Referring now to FIG. 6A, the grating coupler 600 can be blazed to achieve a higher grating efficiency in a given diffraction order. Optical power is therefore concentrated in the desired diffraction order while residual power in the other orders is reduced. The shape of the protrusions and pattern of the grating coupler 600 specify the blaze wavelength for which the grating coupler 600 is blazed. The direction in which optical efficiency is increased is called the blaze angle and is a characteristic of the blazed grating coupler 600. The blaze angle depends on the blaze wavelength and the selected diffraction order.

The blazed grating coupler 600 can have a specific line spacing or pitch that determines a magnitude of a wavelength splitting caused by the grating coupler 600. In some embodiments illustrated and described below with reference to FIG. 6D, a grating coupler can have a triangular or sawtooth-shaped cross section, defining a step structure. The steps can be tilted at a blaze angle with respect to the grating surface. The blaze angle can be designed to increase efficiency for a wavelength of the light. In some embodiments, the blaze angle is designed such that a diffraction angle and an incidence angle correspond. In some embodiments, a larger blaze angle is selected such that the light hits the shorter legs of the triangular grating lines instead of the longer legs. In such embodiments, the grating coupler 600 has a larger line spacing and a higher diffraction order.

The grating coupler 600 of the eyepiece illustrated in FIG. 6A is patterned on a single side of a substrate (e.g., the substrate 400 illustrated and described above with reference to FIG. 4) having a refractive index greater than a threshold value. In some embodiments, the refractive index of the substrate is greater than 1.4. The grating coupler 600 is optically coupled to an in-coupling grating of the eyepiece, similar to the illustration above in FIG. 3A. The grating coupler 600 includes multiple protrusions, e.g., the protrusion 612. Each protrusion 612 has one or more sidewalls, e.g., sidewall 604. Each sidewall 604 of the one or more sidewalls can be oriented at a different angle to the substrate. In some embodiments, the grating coupler 600 illustrated in FIG. 6A is referred to as having a diamond pillar pattern or a diamond protrusion configuration.

In some embodiments, each protrusion 612 of the multiple protrusions includes portions of at least two intersecting ridges oriented in two different directions. The position at which the at least two intersecting ridges meet defines the protrusion 612. In some embodiments, each protrusion has a cylindrical shape. In some embodiments, each protrusion of the grating coupler 600 has an ellipsoidal shape. The dimensions of each ellipsoid interact with the light to diffract the light. In some embodiments, each protrusion has at least one circular surface, e.g., when the protrusion has a cylindrical shape. In some embodiments, each protrusion 612 has at least one triangular surface 608. In other embodiments, each protrusion 612 has at least one polygonal surface. The polygonal surface can correspond to a regular or irregular polygon.

In some embodiments, a fill factor (or a duty cycle) of a volume of each protrusion 612 when measured along a direction of light incident on the multiple protrusions from the in-coupling grating is in a range from 10% to 90%. The fill factor refers to a ratio of a volume of a protrusion 612 to a volume of a recess (empty space) between successive protrusions. In some embodiments, a pitch of an axis of the protrusions is in a range from 300 nm to 450 nm. The pitch refers to the distance measured from a centroid of a first protrusion to a centroid of an adjacent protrusion located in the same row or column as the first protrusion. The centroid refers to the geometric center of mass of a protrusion. In some embodiments, a diagonal pitch of the protrusions is in a range from 300 nm to 900 nm. The diagonal pitch refers to the distance measured from a centroid of a first protrusion to a centroid of the nearest diagonally neighboring protrusion, i.e., the distance between the centroid of a protrusion in one row and that of the nearest protrusion in the next row and next column.

In some embodiments, a height of one or more protrusions is in a range from 5 nm to 500 nm. In other embodiments, a width or a length of a protrusion is in a range from 5 nm to 800 nm. The protrusions can be manufactured in several shapes. For example, a cross-section of a protrusion can have a triangular shape. The multiple protrusions can have a refractive index greater than 1.4. In some embodiments, the grating coupler 600 includes multiple recesses or cavities to diffract light. Each recess or cavity can have one or more sidewalls, similar to the protrusions as discussed above with reference to FIG. 6A. Each sidewall of the one or more sidewalls can be oriented at a different angle to the substrate.

Patterned Protrusions in Grating Coupler

Figure 6B:
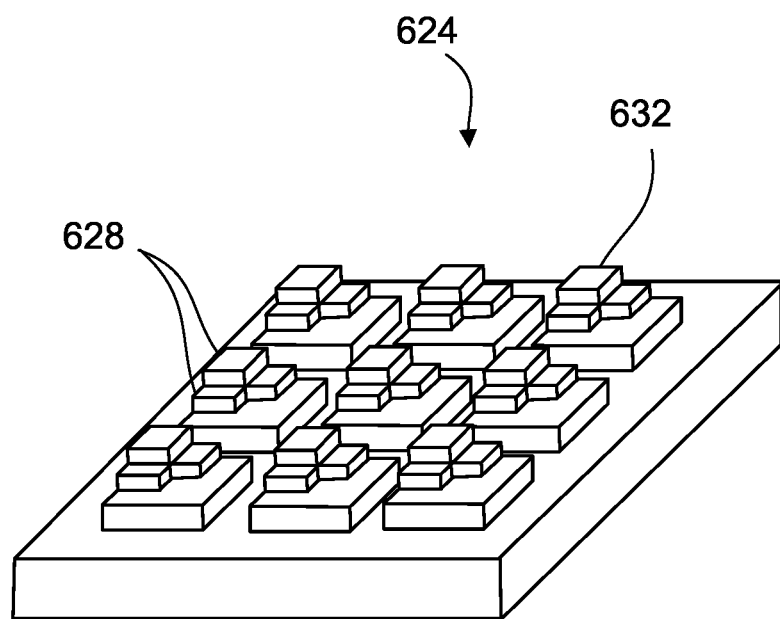
FIG. 6B illustrates cuboid-patterned protrusions in a grating coupler.

FIG. 6B illustrates cuboid-patterned protrusions in a grating coupler 624 in an eyepiece. The grating coupler 624 includes multiple protrusions (e.g., protrusion 632). Each protrusion includes multiple cuboids 628. Each cuboid can have a different height, length, and depth. Therefore, each cuboid can have a different volume of the grating material. Each protrusion 632 has one or more sidewalls. Each protrusion has at least one rectangular surface. The grating coupler 624 illustrated in FIG. 6B is sometimes referred to as having a stepped sloping pillar pattern or a stepped sloping protrusion configuration.

In some embodiments, the eyepiece manufactured using the grating coupler 624 includes a substrate (e.g., the substrate 400 illustrated and described above with reference to FIG. 4) and an in-coupling grating imprinted on a single side of the substrate. The grating coupler 624 is also imprinted on the single side of the substrate and optically coupled to the in-coupling grating. The grating coupler 624 can include multiple tiles defining an EPE of the eyepiece, as illustrated and described above with reference to FIG. 3B. A grating region (e.g., the grating region 368) can be interspersed between the tiles to define an OPE of the eyepiece. Each tile of the grating coupler 624 can include multiple cuboids 628 and each cuboid 628 can have a different height. In some embodiments, a height of each cuboid is in a range from 5 nm to 500 nm. In other embodiments, a width or a length of each cuboid is in a range from 5 nm to 800 nm. A cross-section of each cuboid has a rectangular shape. In some embodiments, a cross-section of each protrusion 632 has a staircase shape.

Figure 6C:
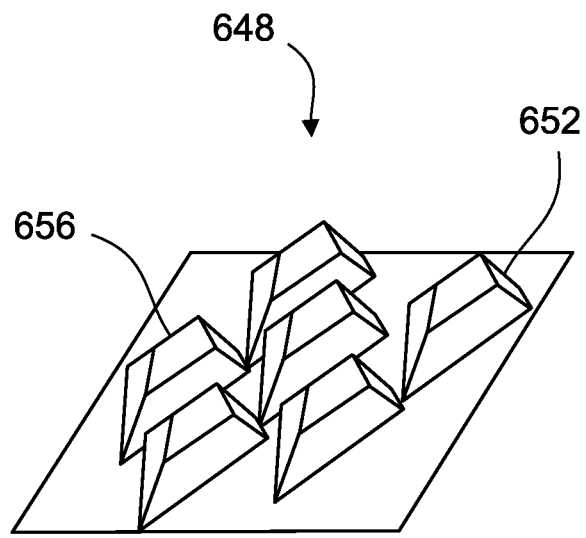
FIG. 6C illustrates protrusions in a grating coupler in an optical eyepiece.

FIG. 6C illustrates protrusions in a grating coupler 648 in an optical eyepiece. The grating coupler 648 may be blazed as described and illustrated above with reference to FIG. 6A. In some embodiments, each protrusion 652 has at least one rectangular surface. For example, the top surface 656 may be rectangular. In some embodiments, each protrusion has at least one circular surface, e.g., when the protrusion has a cylindrical shape. In some embodiments, each protrusion has at least one triangular surface. In other embodiments, each protrusion has at least one polygonal surface.

Figure 6D:
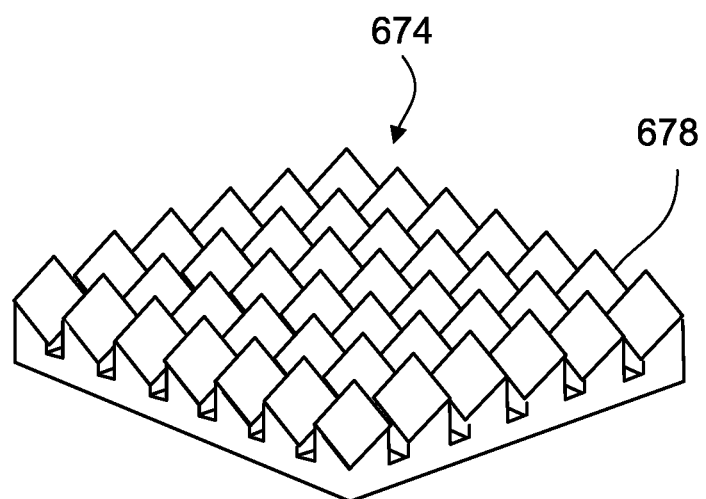
FIG. 6D illustrates sawtooth-patterned protrusions in a grating coupler in an optical eyepiece.

FIG. 6D illustrates sawtooth-patterned protrusions 678 in a grating coupler 674 in an optical eyepiece. A cross-section of the multiple protrusions has a sawtooth shape. In some embodiments, the portion of the grating coupler 674 illustrated in FIG. 6D may be part of an interdigitated alternating grating pattern including multiple ridges or protrusions arranged in a sawtooth grating pattern.

Patterning of Grating Couplers

Figure 7A:
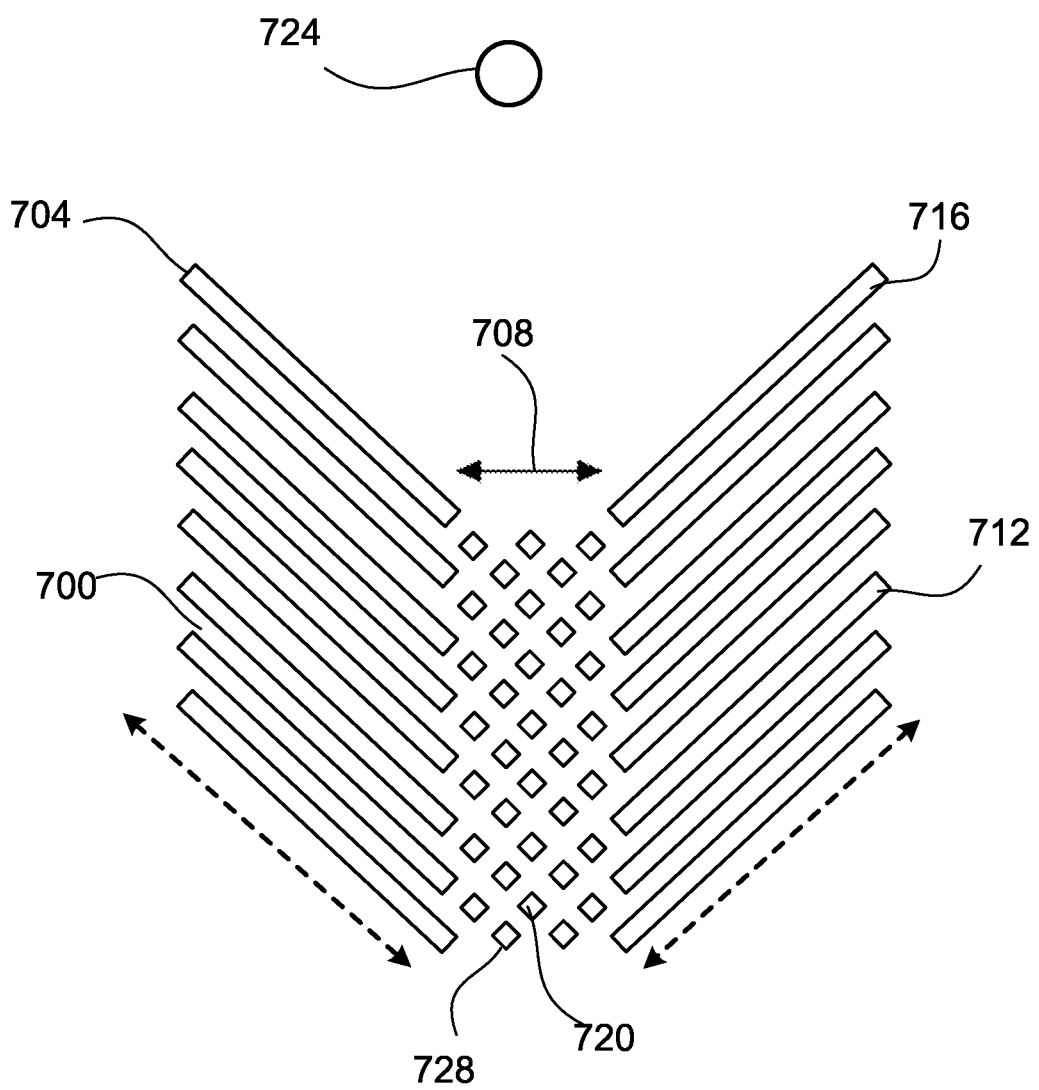
FIG. 7A illustrates patterning of grating couplers in an optical eyepiece.

FIG. 7A illustrates patterning of grating couplers in an optical eyepiece. The eyepiece illustrated in FIG. 7A includes an in-coupling grating 724 patterned on a single side of a substrate (e.g., the substrate 400 illustrated and described above with reference to FIG. 4). The configuration illustrated in FIG. 7A is sometimes referred to as a winged grating configuration or winged grating pattern. In a winged grating configuration, three or more grating couplers are patterned on a single side of the substrate. The three or more grating couplers are optically coupled to the in-coupling grating 724. Each grating coupler of the three or more grating couplers has a different grating pattern, as illustrated in FIG. 7A.

The in-coupling grating 724 is configured to diffract light, received from a projector (e.g., projector 300), into three or more portions of the light. Each portion of the light has a different orientation with respect to the light received from the projector 300. The in-coupling grating 724 is further configured to direct a corresponding portion of the light to each grating coupler. Each grating coupler is configured to further diffract the corresponding portion of the light. The eyepiece is configured to combine the diffracted three or more portions of the light for transmission to an eyeball (e.g., the eyeball 328) of a user.

A first grating coupler 700 includes first linear grating segments 704 oriented in a first direction. The second grating coupler 712 includes second linear grating segments 716 oriented in a second direction different from the first direction. In some embodiments, an angle between the first direction and the second direction is in a range from 55 to 65 degrees. At least one grating coupler is located between two other grating couplers in the eyepiece. For example in FIG. 7A, the third grating coupler 728 having the tiles 720 is located between the first grating coupler 700 and the second grating coupler 712. In some embodiments, a width 708 of the third grating coupler 728 (corresponding to a width of an eyebox of the eyepiece) located between the first grating coupler 700 and the second grating coupler 712 is in a range from 5 mm to 20 mm. The grating coupler 728 located between the two other grating couplers 700 and 712 includes multiple tiles 720 having a specific grating pattern. The tiles 720 can include protrusions, cavities or recesses, or ridges. In some embodiments, each tile of the multiple tiles 720 has a polygonal shape.

Figure 7B:
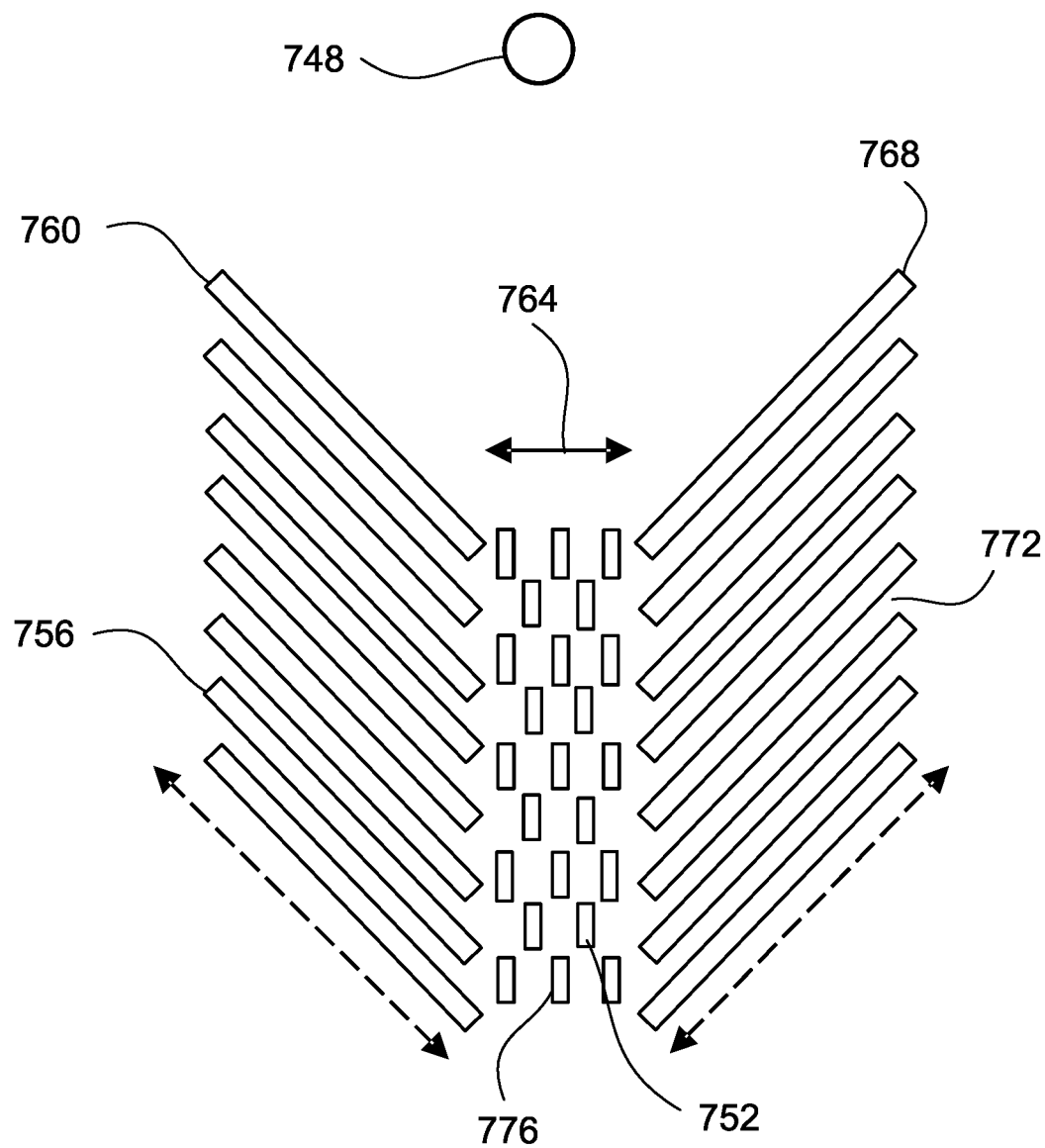
FIG. 7B illustrates patterning of grating couplers in an optical eyepiece.

FIG. 7B illustrates patterning of grating couplers in an optical eyepiece. The eyepiece illustrated in FIG. 7B includes an in-coupling grating 748 and three or more grating couplers (including the first grating coupler 756, the second grating coupler 772, and the third grating coupler 776). The configuration of FIG. 7B is sometimes referred to as a winged grating configuration or winged grating pattern.

In a winged grating configuration or winged grating pattern, at least one grating coupler is located between two other grating couplers. For example in FIG. 7B, the third grating coupler 776 including the linear segments 752 is located between the first grating coupler 756 and the second grating coupler 772. In some embodiments, a width 764 of the grating coupler (corresponding to a width of an eyebox of the eyepiece) including the multiple linear grating segments 752 is in a range from 5 mm to 20 mm.

The first grating coupler 756 includes first linear grating segments 760 oriented in a first direction. The second grating coupler 772 includes second linear grating segments 768 oriented in a second direction different from the first direction. In some embodiments, an angle between the first direction and the second direction is in a range from 55 degrees to 65 degrees. In some embodiments, as illustrated in FIG. 7B, the pitch spacing of the features of the third two-dimensional (2D) grating coupler 776 can be determined from the pitch spacing defined by the intersection of the features defining the first one-dimensional (1D) grating coupler 756 and the second 1D grating coupler 772. Differences between the pitch spacing of the features of the grating coupler 776 and the pitch spacing of the intersection of the features of the grating couplers 756 and 772 can cause virtual image shift or virtual image swim that is visible when moving from one grating region to another grating region. Such image swim is not desirable, for example, when there is a change in eye position over the CPE area while viewing the virtual image or when the inter pupil distance (IPD) for a large human population is different. The embodiments illustrated in FIG. 7B reduce image swim for the single side full field of view (FOV) waveguide by generating undistorted virtual images. The embodiments illustrated with reference to FIGS. 7A and 7B can be implemented to achieve a preferential diffraction order. The preferential diffraction order reduces the occurrence of the central bright band in the resulting images and increases eyepiece uniformity. The sharpness of the resulting image is also increased.

Patterning of Grating Couplers

Figure 8A:
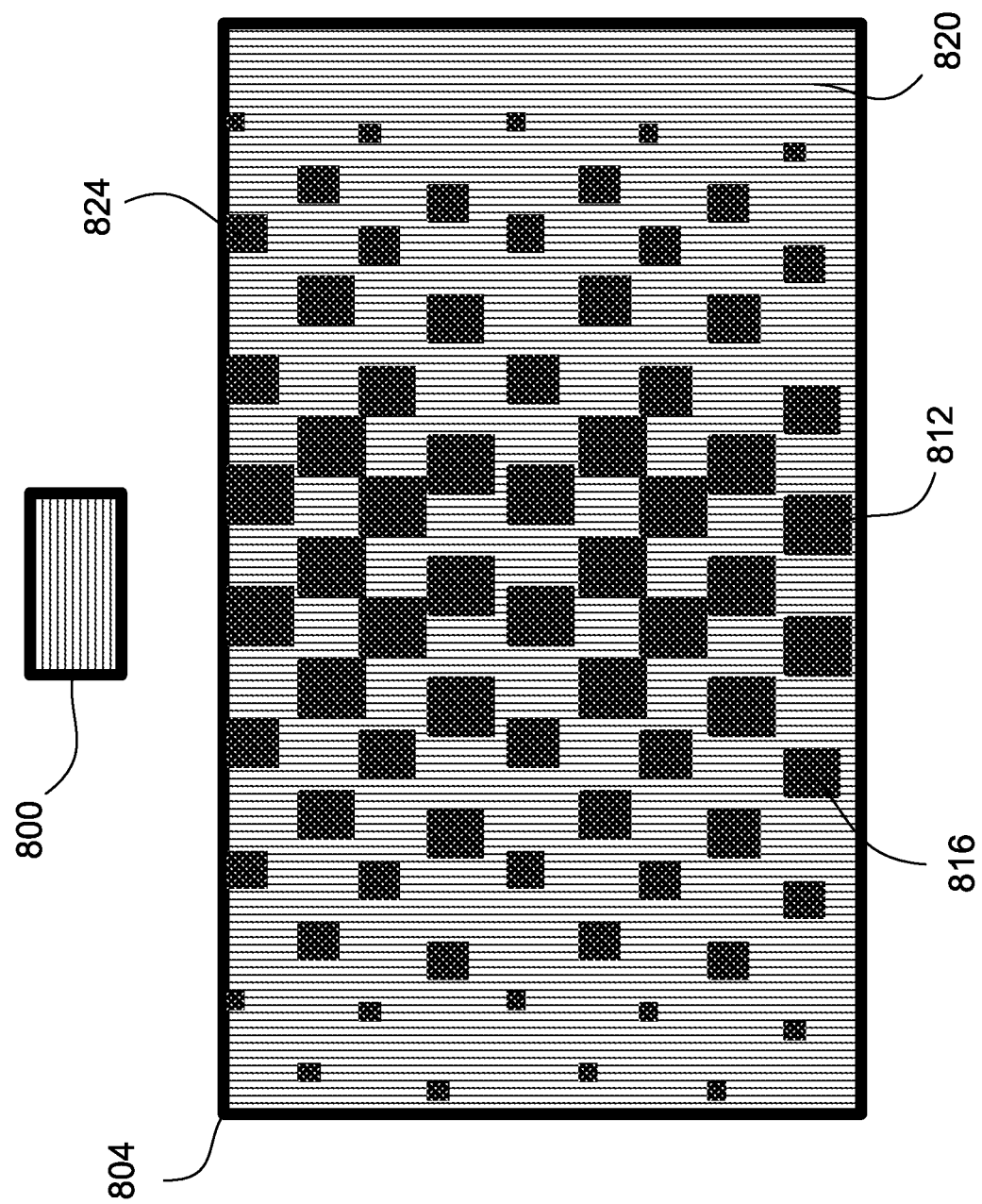
FIG. 8A illustrates patterning of grating couplers in an optical eyepiece.

FIG. 8A illustrates patterning of grating couplers 816 and 820 in an optical eyepiece. The eyepiece illustrated in FIG. 8A includes a substrate (e.g., the substrate 400 illustrated and described above with reference to FIG. 4) and an in-coupling grating 800 imprinted on a single side of the substrate. The in-coupling grating 800 includes a first set of parallel ridges. A first grating coupler 816 is imprinted on the single side of the substrate and optically coupled to the in-coupling grating 800. The configuration shown in FIG. 8A is sometimes referred to as a tiled snowflake grating configuration or tiled snowflake grating pattern. The first grating coupler 816 includes multiple tiles 824 defining an EPE of the eyepiece. The tiles 824 have a first grating pattern, e.g., ridges, protrusions, recesses, etc.

In some embodiments, each tile 824 includes multiple protrusions. Each protrusion has one or more sidewalls. Each sidewall is oriented at a different angle to the substrate. In other embodiments, each protrusion includes two intersecting ridges oriented in two different directions. In other embodiments, each tile 824 includes multiple cuboids. Each cuboid has a different height. In some embodiments, an area of each tile decreases as a position of the tile changes from the center region 812 of the grating coupler 816 to a boundary 804 of the grating coupler 816. The tiles proximal to the boundary 804 are smaller in area than the tiles proximal to the center region 812.

A second grating coupler (the grating region 820) is interspersed between the multiple tiles 824. The grating region 820 has a second grating pattern different from the first grating pattern. The grating region 820 includes a second set of parallel ridges orthogonal to the first set of parallel ridges of the in-coupling grating 800. The grating region 820 defines an OPE of the eyepiece. The layout of the tiles 824 can be altered to achieve a higher uniformity of the far field virtual image. By varying the shape, size, distribution, and density of the tiles, higher uniformity of the far field virtual image is obtained. In some embodiments, the size of each tile can be kept the same while the tile density is decreased from denser to more sparse. The distribution of the tiles 824 can be either periodic or random. The sharpness of the resulting image is also increased. The different design choices provided by the embodiments disclosed herein provide higher optical efficiency and quality.

In some embodiments, the grating couplers 816 and 820 are configured to receive light diffracted by the in-coupling grating 800. The grating couplers 816 and 820 are configured to reduce a brightness of the light emitted by a center region 812 of the grating couplers 816 and 820. In some embodiments, the grating couplers 816 and 820 are configured to diffuse the light emitted by the center region 812.

Patterning of Grating Couplers

Figure 8B:
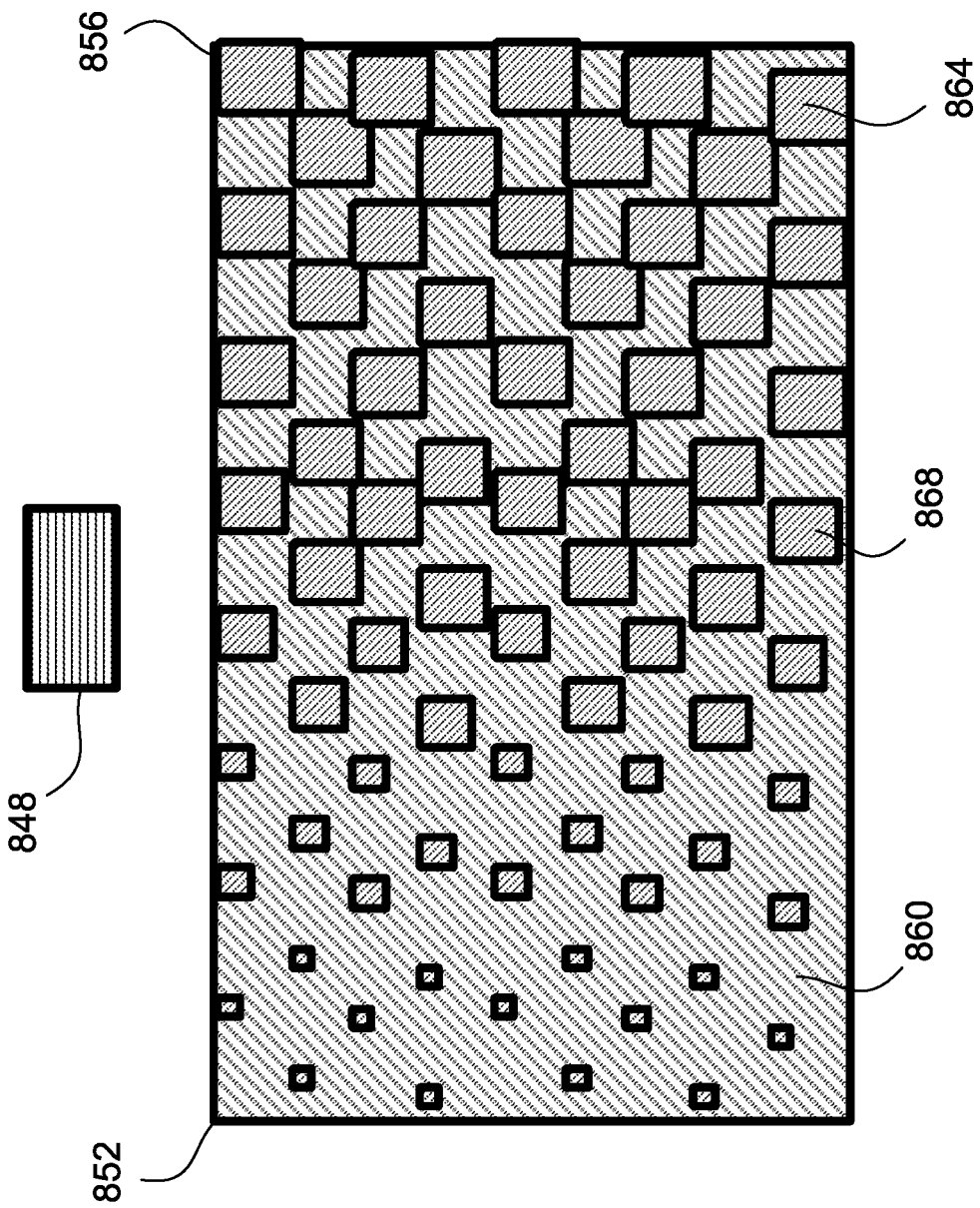
FIG. 8B illustrates patterning of grating couplers in an optical eyepiece.

FIG. 8B illustrates patterning of grating couplers 868 and 860 in an optical eyepiece. The eyepiece illustrated in FIG. 8B includes a substrate (e.g., the substrate 400 illustrated and described above with reference to FIG. 4) and an in-coupling grating 848 imprinted on a single side of the substrate. A first grating coupler 868 is imprinted on the single side of the substrate and is optically coupled to the in-coupling grating 848. The first grating coupler 868 includes multiple tiles defining an EPE of the eyepiece.

Each tile 864 has a first grating pattern (e.g., parallel ridges, protrusions, recesses, etc.). In some embodiments, each tile 864 includes multiple recesses. Each recess of the multiple recesses has one or more sidewalls. In some embodiments, the multiple recesses have a refractive index greater than 1.4. In some embodiments, at least one of a width or a length of each recess is in a range from 5 nm to 800 nm. In some embodiments, a cross-section of each recess has a triangular, a sawtooth, a staircase, or a multi-stepped shape. A second grating coupler (the grating region 860) is interspersed between the tiles. The grating region 860 has a second grating pattern different from the first grating pattern. The grating region 860 defines an OPE of the eyepiece. As illustrated in FIG. 8B, an area of each tile 864 increases as a position of the tile 864 changes from a first boundary 852 of the grating region 860 to a second boundary 856. The configuration of FIG. 8B is sometimes referred to as a tiled honeycomb grating configuration or tiled honeycomb grating pattern.

In some embodiments, the in-coupling grating 848 is configured to receive light from a projector (e.g., the projector 300 illustrated and described above with reference to FIG. 3A). The in-coupling grating 848 is configured to diffract the light (e.g., the light 332 shown in FIG. 3A) into a first portion of the light (e.g., the portion 336) and a second portion of the light (e.g., the portion 312). The first portion 336 has a first orientation with respect to the light 332 received from the projector 300. The second portion 312 has a second orientation with respect to the light 332 received from the projector 300. The second orientation is different from the first orientation. A diffraction grating is patterned on a single side of the substrate. The diffraction grating is configured to receive the first portion 336 of the light and the second portion 312 of the light from the in-coupling grating 848. The diffraction grating includes a first grating coupler 868 and a second grating coupler 860. The first grating coupler 868 includes multiple tiles (e.g., tile 864). The second grating coupler 860 includes the grating region 860. The first grating coupler 868 receives the first portion 336 of the light from the in-coupling grating 848. The first grating coupler 868 diffracts the first portion 336 of the light. The first grating coupler 868 directs, to the second grating coupler 860, the diffracted first portion (e.g., portion 340) of the light. The second grating coupler 860 receives the second portion 312 of the light from the in-coupling grating 848. The second grating coupler 860 further diffracts the second portion 312 of the light. The second grating coupler 860 directs, to the first grating coupler 868, the diffracted second portion (e.g., portion 316) of the light. The diffraction grating is further configured to combine the diffracted first portion 340 of the light and the diffracted second portion 316 of the light.

Patterning of Grating Coupler

Figure 9A:
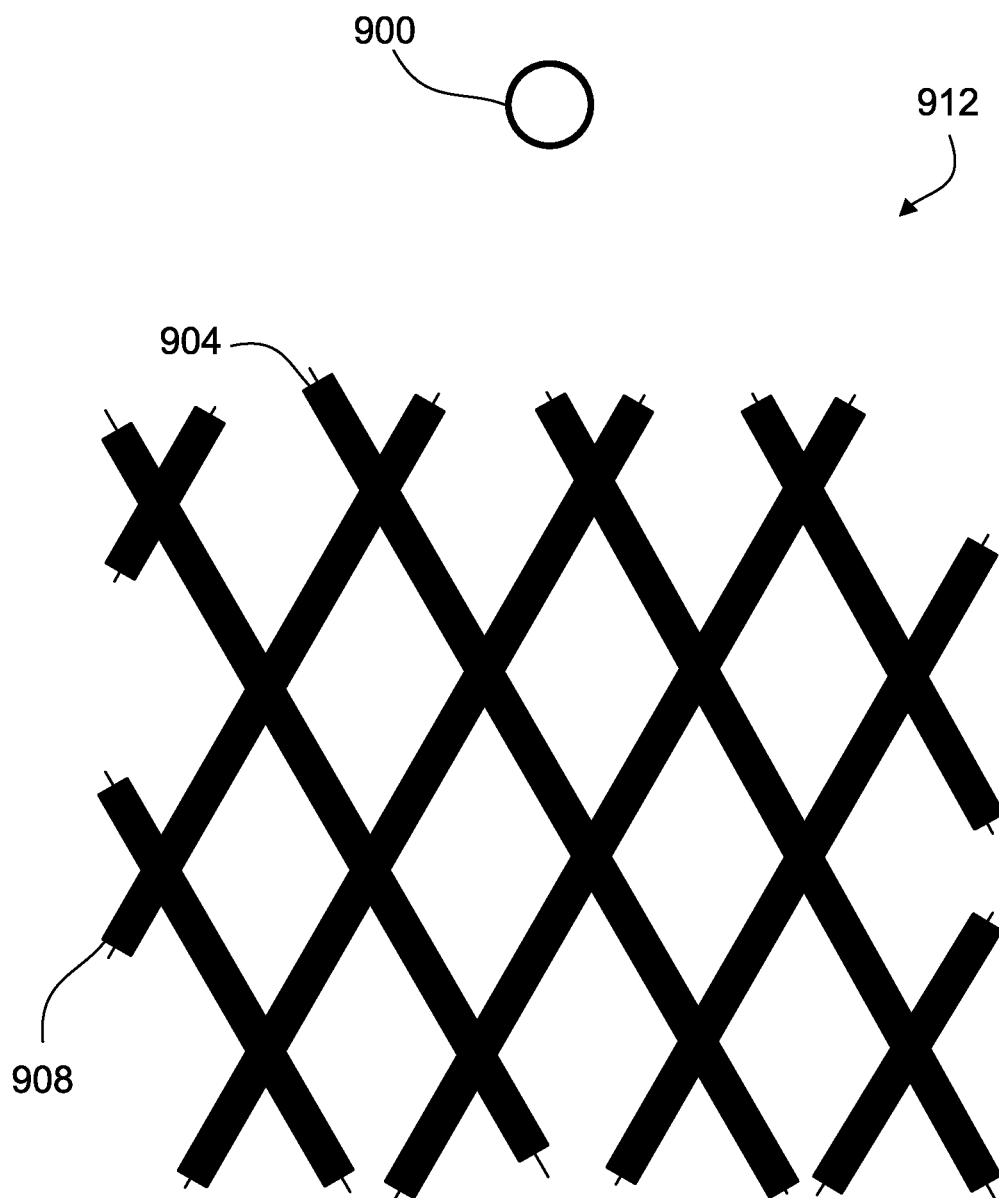
FIG. 9A illustrates patterning of a grating coupler in an optical eyepiece.

FIG. 9A illustrates patterning of a grating coupler 912 in an optical eyepiece. The eyepiece shown in FIG. 9A includes an in-coupling grating 900 and the grating coupler 912. The grating coupler 912 includes multiple intersecting linear grating segments. For example, the linear grating segment 904 intersects with the linear grating segment 908. The multiple intersecting linear grating segments are arranged in a hexagonally packed grating pattern. The grating coupler 912 is sometimes referred to as having a thin-line single-side honeycomb grating pattern or configuration. Each polygon defined by the grating coupler 912 defines at least one angle between two linear grating segments (e.g., 904 and 908) is in a range from 55 degrees to 65 degrees. Each polygon defined by the grating coupler 912 defines at least one other angle between the two linear grating segments 904 and 908 is in a range from 115 degrees to 125 degrees. In some embodiments, the eyepiece shown in FIG. 9A further includes a second grating coupler. The second grating coupler includes a grating area adjacent to the multiple linear grating segments of the grating coupler 912. The grating coupler 912 functions similarly to the grating couplers illustrated and described above with reference to FIGS. 3A, 3B, 4, 7A, 7B, 8A, and 8B.

Figure 9B:
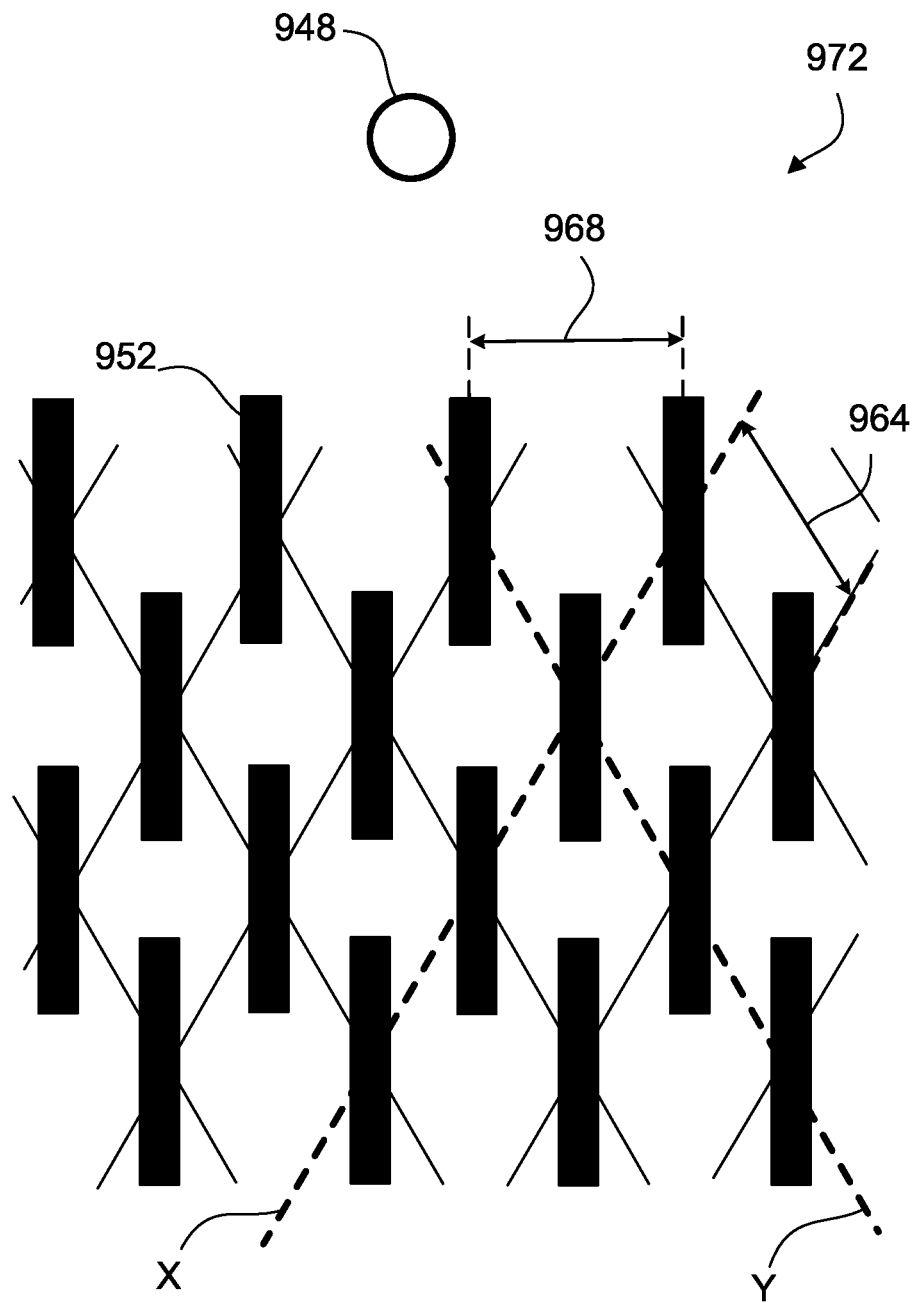
FIG. 9B illustrates patterning of a grating coupler in an optical eyepiece.

FIG. 9B illustrates patterning of a grating coupler 972 in an optical eyepiece. The eyepiece illustrated in FIG. 9B includes an in-coupling grating 948 and the grating coupler 972 optically coupled to the in-coupling grating 948. The grating coupler 972 includes multiple linear grating segments arranged in a honeycomb grating pattern. For example, the grating coupler 972 includes the linear grating segment 952. In some embodiments, the eyepiece includes a second grating coupler. The second grating coupler can include a grating area adjacent to the multiple linear grating segments of the grating coupler 972. The grating coupler 972 is sometimes referred to as having a thin-line single-side honeycomb grating pattern or configuration.

In some embodiments, the grating coupler 972 further includes multiple protrusions. In some embodiments, a pitch 968 of an axis of the protrusions is in a range from 300 nm to 450 nm. In some embodiments, a diagonal pitch 964 of the multiple protrusions is in a range from 300 nm to 900 nm. In some embodiments, the grating coupler 972 includes a first set of protrusions having a first pitch axis 956 and the second grating coupler includes a second set of protrusions having a second pitch axis 960. In some embodiments, an angle between the first pitch axis 956 and the second pitch axis 960 is approximately 90 degrees with or without an overlap of features in each of the pitch axis directions. In some embodiments, an angle between the first pitch axis 956 and the second pitch axis 960 is in a range from 55 degrees to 65 degrees with or without an overlap of features in each of the pitch axis directions. The feature overlap can be approximately 30% of a length or a width of a protrusions.

Patterning of Grating Coupler

Figure 10:
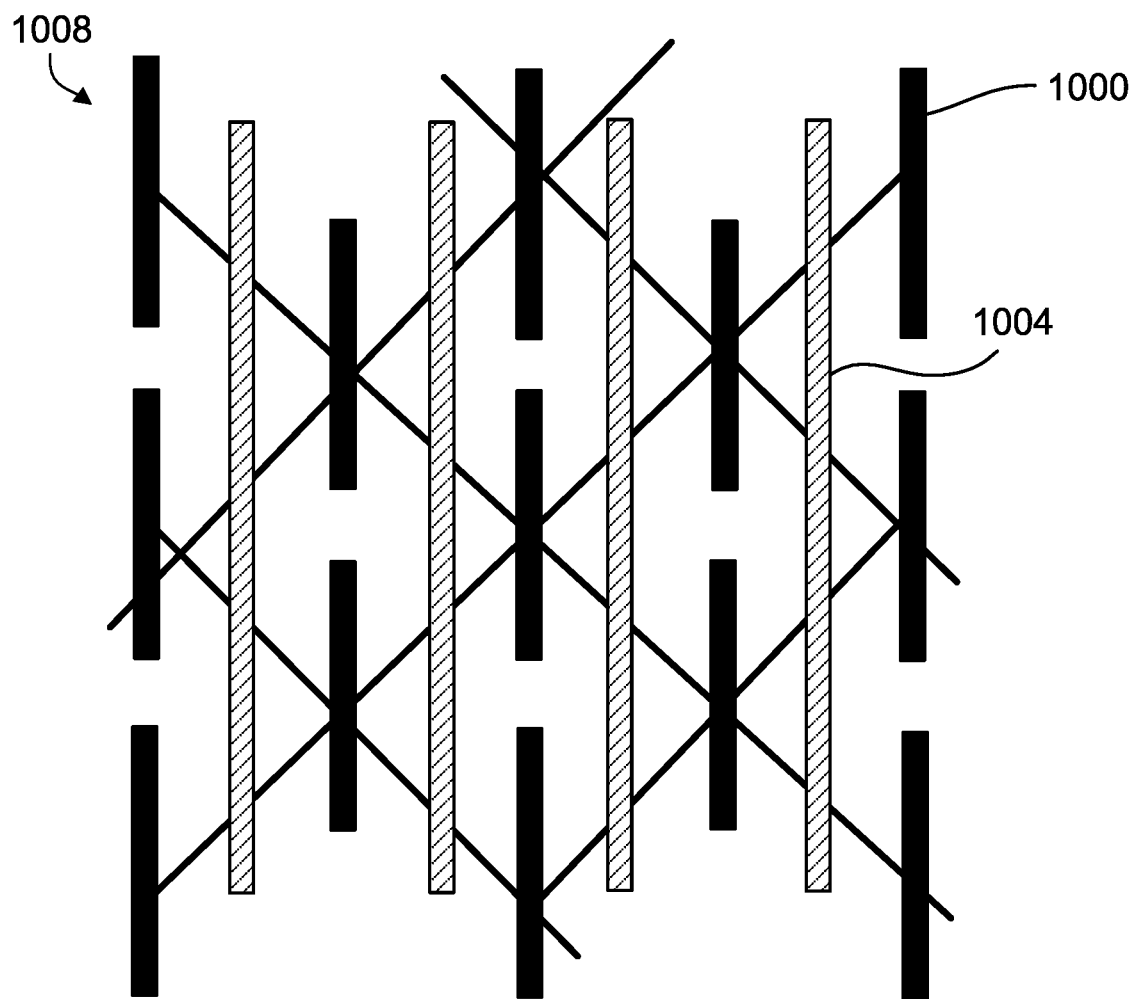
FIG. 10 illustrates patterning of a grating coupler in an optical eyepiece.

FIG. 10 illustrates patterning of a grating coupler 1008 in an optical eyepiece. The grating coupler 1008 includes a first set of linear grating segments 1000 defining an OPE of the eyepiece. The grating coupler 1008 includes a second set of linear grating segments 1004 defining an EPE of the eyepiece. The second set of linear grating segments 1004 are interleaved with the first set of linear grating segments 1000. The grating coupler 1008 is sometimes referred to as having a snowflake grating pattern or configuration.

In the eyepiece embodiments illustrated with reference to FIGS. 9A, 9B, and 10 above, the geometry of the in-coupling grating (e.g., the in-coupling grating 900), the OPE (e.g., the OPE 1000), and the EPE (e.g., the EPE 1004) is tuned such that the in-coupling grating 900 and the eyepiece have preferential diffraction orders. The portion of light that is directly coupled or diffracted into the eyeball 328 of the user is reduced, thus decreasing the unwanted artifacts. The eyepiece embodiments illustrated with reference to FIGS. 9A, 9B, and 10 above therefore prevent the occurrence of central bright band artifacts in the resulting images. The diffraction properties of the OPE and EPE gratings can be further improved using slanting and blazing of protrusions, or multi-stepped protrusions or recesses.

Patterning of Grating Couplers in an Optical Eyepiece

Figure 11A:
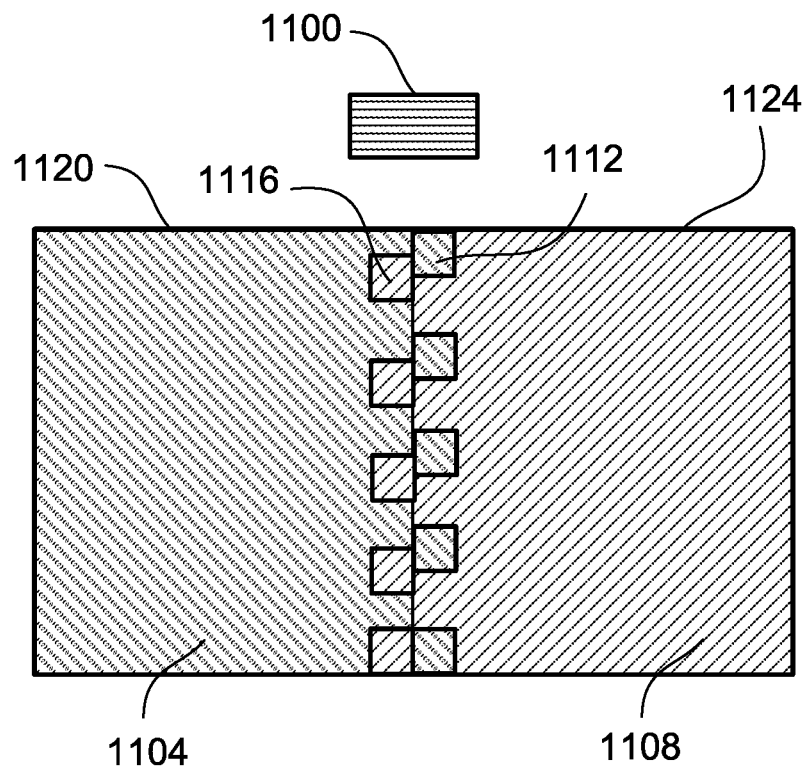
FIG. 11A illustrates patterning of grating couplers in an optical eyepiece.

FIG. 11A illustrates patterning of grating couplers in an optical eyepiece. The eyepiece illustrated in FIG. 11A includes a substrate (e.g., the substrate 400 illustrated and described above with reference to FIG. 4) having a refractive index greater than a threshold value. In some embodiments, the threshold value is 1.4. The eyepiece further includes an in-coupling grating 1100 patterned on a single side of the substrate. A first grating coupler 1120 is patterned on the single side of the substrate. The first grating coupler 1120 is optically coupled to the in-coupling grating 1100 to receive a portion of light from the in-coupling grating 1100. The first grating coupler 1120 has a first grating pattern 1104.

A second grating coupler 1124 is also patterned on the single side of the substrate. The second grating coupler 1124 is optically coupled to the in-coupling grating 1100. The second grating coupler 1124 is adjacent to the first grating coupler 1120. The second grating coupler 1124 has a second grating pattern 1108 that is different from the first grating pattern 1104. In some embodiments, the first grating coupler 1120 or the first grating pattern 1104 includes a first set of ridges oriented in a first direction. The second grating coupler 1124 or the second grating pattern 1108 includes a second set of ridges oriented in a second direction as shown in FIG. 11A. In some embodiments, an angle between the first direction and the second direction is in a range from 55 degrees to 65 degrees.

In some embodiments, the in-coupling grating 1100 includes a first set of parallel ridges oriented in a first direction. The first grating coupler 1120 includes a second set of parallel ridges oriented in a second direction different from the first direction. The second grating coupler 1124 includes a third set of parallel ridges oriented in a third direction different from the first direction and the second direction. In some embodiments, an angle between the second direction and the third direction is in a range from 55 to 65 degrees.

In some embodiments, the first grating coupler 1120 contacts the second grating coupler 1124. Tiles (e.g., tile 1116) patterned using the second grating pattern 1108 are inserted into the first grating coupler 1120. Other tiles (e.g., tile 1112) patterned using the first grating pattern 1104 are inserted into the second grating coupler 1124. A tiled pattern (e.g., including the tiles 1112 and 1116) is thus defined at the locations where the first grating coupler 1120 contacts the second grating coupler 1124. The tile 1112 has the first grating pattern 1104. The tile 1116 has the second grating pattern 1108. In this manner, the tiled region is configured to diffuse the light that is directly coupled into the eyeball 328 of a user of the eyepiece. Sharp transitions from the left to the right field of views are smeared out. The tile size, density, shape, and distribution can be varied to achieve a higher virtual image resolution, uniformity, and brightness. The sharpness of the resulting image is also increased.

In some embodiments, the locations where the first grating coupler 1120 contacts the second grating coupler 1124 includes an interdigitated alternating grating pattern similar to the interdigitated grating pattern 500 illustrated and described above with reference to FIG. 5A. In some embodiments, the locations where the first grating coupler 1120 contacts the second grating coupler 1124 includes a stencil that blends a first boundary of the first grating coupler 1120 with a second boundary of the second grating coupler 1124.

Blended Patterning of Grating Couplers in an Optical Eyepiece

Figure 11B:
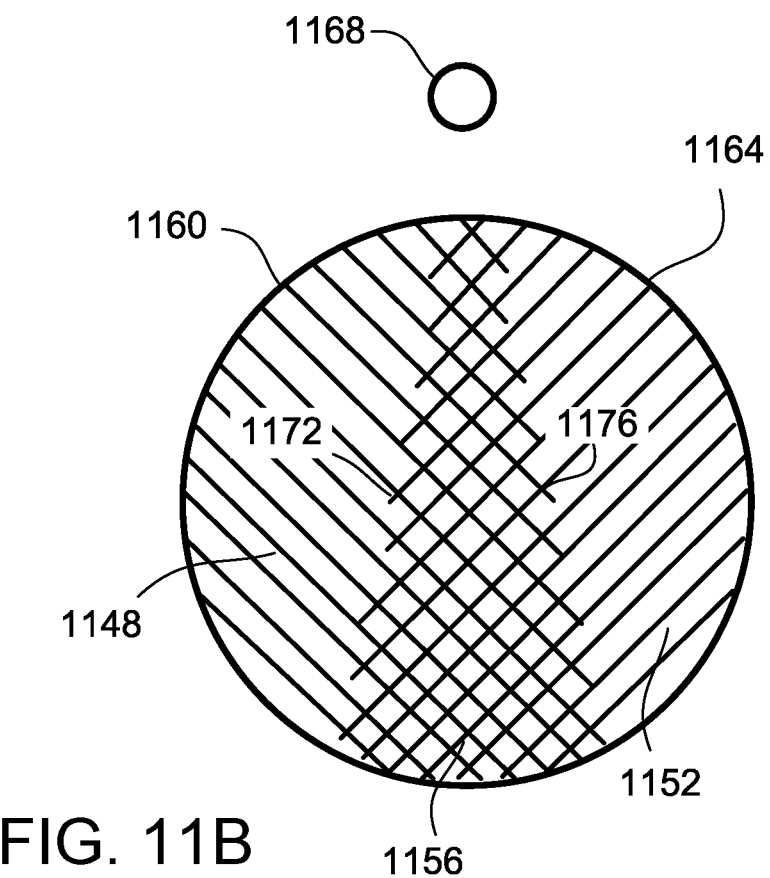
FIG. 11B illustrates blended patterning of grating couplers in an optical eyepiece.

FIG. 11B illustrates blended patterning of grating couplers in an optical eyepiece. The eyepiece illustrated in FIG. 11B includes an in-coupling grating 1168 configured to diffract light received from a projector (e.g., the projector 300 illustrated and described above with reference to FIG. 3). The in-coupling grating 1168 diffracts the light into a first portion of the light and a second portion of the light. A first grating coupler 1160 is optically coupled to the in-coupling grating 1168. The in-coupling grating 1168 is configured to direct, to the first grating coupler 1160, the first portion of the light. The first grating coupler 1160 has a first grating pattern 1148. A second grating coupler 1164 is also optically coupled to the in-coupling grating 1168. The in-coupling grating 1168 is further configured to direct, to the second grating coupler 1164, the second portion of the light. The second grating coupler 1164 has a second grating pattern 1152 different from the first grating pattern 1148.

A first boundary 1172 of the first grating coupler 1160 is blended with a second boundary 1176 of the second grating coupler to define a blended grating area 1156. In some embodiments, the blended grating area 1156 includes an interdigitated alternating pattern of the first grating pattern 1148 and the second grating pattern 1152. In some embodiments, the blended grating area 1156 includes a stencil that blends the first boundary 1172 of the first grating coupler 1160 with the second boundary 1176 of the second grating coupler 1164. In some embodiments, a merged grating zone including graded nano-features is created to avoid a bright band in the center of an image. The grating features separate out into the two distinct grating patterns from the center of the grating towards each edge.

Diffraction and Coupling of Light Using Grating Couplers in an Optical Eyepiece

Figure 12:
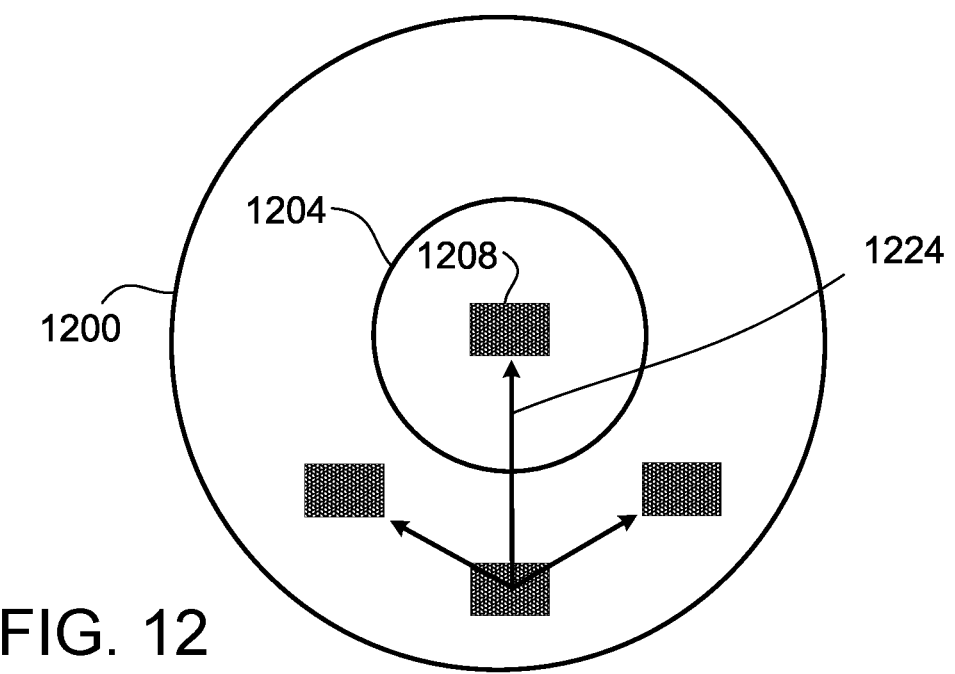
FIG. 12 illustrates diffraction and coupling of light using grating couplers in an optical eyepiece.

FIG. 12 illustrates diffraction and coupling of light using grating couplers in an optical eyepiece. FIG. 12 depicts a manner in which a k-space of light rays that are allowed to propagate in a waveguide can be viewed. The gratings of FIG. 12 are angled such that they allow for the light 1224 to diffract in particular directions (spread and exit) such that the angled light reaches the user's field of view.

The outer circle 1200 corresponds to the angle condition for light to propagate within a high-index substrate. The inner circle 1204 represents the conditions for light to propagate in air. The annulus between the two concentric circles 1200 and 1204 corresponds to the total internal reflection (TIR) condition for light to propagate in the planer waveguide. The rectangle 1208 represents the field of view in the air.

Additional Embodiments

In some embodiments, an eyepiece includes an in-coupling grating patterned on a single side of a substrate and configured to diffract light, received from a projector, into a first portion of the light and a second portion of the light. The first portion has a first orientation with respect to the light received from the projector and the second portion has a second orientation with respect to the light received from the projector. The second orientation is different from the first orientation. A diffraction grating is patterned on the single side of the substrate and configured to receive, from the in-coupling grating, the first portion of the light and the second portion of the light. The first portion of the light and the second portion of the light are diffracted. The diffracted first portion of the light and the diffracted second portion of the light are combined.

In some embodiments, the first grating coupler includes a first set of protrusions having a first pitch axis. The second grating coupler includes a second set of protrusions having a second pitch axis.

In some embodiments, an angle between the first pitch axis and the second pitch axis is in a range from 55 degrees to 65 degrees.

In some embodiments, a first region of the first grating coupler overlaps a second region of the second grating coupler. Each of the overlapped first region and the overlapped second region have an interdigitated alternating grating pattern.

In some embodiments, the interdigitated alternating grating pattern is configured to diffuse a third portion of the light. The third portion of the light is directly diffracted, by the eyepiece, into an eyeball of a user of the eyepiece.

In some embodiments, the interdigitated alternating grating pattern includes a stencil that blends a first boundary of the first grating coupler with a second boundary of the second grating coupler.

In some embodiments, the interdigitated alternating grating pattern includes at least one of multiple parallel ridges oriented in a particular direction, multiple ridges arranged in a Chevron grating pattern, or multiple ridges arranged in a sawtooth grating pattern.

In some embodiments, the interdigitated alternating grating pattern includes multiple protrusions. Each protrusion of the multiple protrusions has one or more sidewalls. Each sidewall of the one or more sidewalls is oriented at a different angle to the substrate In some embodiments, the protrusions have a refractive index greater than 1.4.

In some embodiments, the first grating coupler includes tiles having a first grating pattern. The second grating coupler includes a grating area adjacent to the tiles and having a second grating pattern different from the first grating pattern.

In some embodiments, the in-coupling grating includes a first set of parallel ridges oriented in a first direction. The first grating coupler includes a second set of parallel ridges oriented in a second direction different from the first direction. The second grating coupler includes a third set of parallel ridges oriented in a third direction different from the first direction and the second direction.

In some embodiments, an angle between the second direction and the third direction is in a range from 55 degrees to 65 degrees.

In some embodiments, the first grating coupler includes multiple parallel grating segments oriented in a particular direction and having a first grating pattern. The second grating coupler includes a grating area adjacent to the multiple parallel grating segments and having a second grating pattern different from the first grating pattern.

In some embodiments, the first grating coupler includes multiple linear grating segments arranged in a honeycomb grating pattern. The second grating coupler includes a grating area adjacent to the multiple linear grating segments.

In some embodiments, an eyepiece includes an in-coupling grating imprinted on a single side of a substrate and a grating coupler imprinted on the single side of the substrate and optically coupled to the in-coupling grating. The grating coupler includes multiple tiles defining an exit pupil expander (EPE) of the eyepiece. Each tile of the multiple tiles has a first grating pattern. A grating region is interspersed between the multiple tiles and has a second grating pattern different from the first grating pattern. The grating region defines an orthogonal pupil expander (OPE) of the eyepiece.

In some embodiments, the grating coupler is configured to receive light diffracted by the in-coupling grating and reduce a brightness of the light emitted by a center region of the grating coupler.

In some embodiments, the grating coupler is configured to receive light diffracted by the in-coupling grating and diffuse the light emitted by a center region of the grating coupler.

In some embodiments, each tile of the multiple tiles includes multiple protrusions. Each protrusion of the multiple protrusions has one or more sidewalls. Each sidewall of the one or more sidewalls is oriented at a different angle to the substrate.

In some embodiments, each protrusion of the multiple protrusions includes two intersecting ridges oriented in two different directions.

In some embodiments, each protrusion of the multiple protrusions has a cylindrical or ellipsoidal shape.

In some embodiments, each protrusion of the multiple protrusions has at least one rectangular, circular, triangular, or polygonal surface.

In some embodiments, each tile of the multiple tiles includes multiple cuboids. Each cuboid of the multiple cuboids has a different height.

In some embodiments, the in-coupling grating includes a first set of parallel ridges. The grating region includes a second set of parallel ridges orthogonal to the first set of parallel ridges.

In some embodiments, an area of each tile of the multiple tiles decreases as a position of the tile changes from a center of the grating coupler to a boundary of the grating coupler.

In some embodiments, an area of each tile of the multiple tiles increases as a position of the tile changes from a first boundary of the grating coupler to a second boundary of the grating coupler.

In some embodiments, each tile of the multiple tiles has at least one of a rectangular shape, a circular shape, an elliptical shape, a polygonal shape, or a hexagonal shape.

In some embodiments, each tile of the multiple tiles includes multiple recesses. Each recess of the multiple recesses has one or more sidewalls.

In some embodiments, the multiple recesses have a refractive index greater than 1.4.

In some embodiments, at least one of a width or a length of each recess of the multiple recesses is in a range from 5 nm to 800 nm.

In some embodiments, a cross-section of each recess of the multiple recesses has a triangular, sawtooth, or staircase shape.

In some embodiments, an eyepiece includes a substrate having a refractive index greater than a threshold value and an in-coupling grating patterned on a single side of the substrate. Three or more grating couplers are patterned on the single side of the substrate and optically coupled to the in-coupling grating. Each grating coupler of the three or more grating couplers have a different grating pattern.

In some embodiments, the in-coupling grating is configured to diffract light, received from a projector, into three or more portions of the light.

In some embodiments, each portion of the three or more portions of the light has a different orientation with respect to the light received from the projector.

In some embodiments, the in-coupling grating is further configured to direct, to the each grating coupler of the three or more grating couplers, a corresponding portion of three or more portions of the light.

In some embodiments, each grating coupler of the three or more grating couplers is configured to diffract the corresponding portion of the three or more portions of the light.

In some embodiments, the eyepiece is configured to combine the diffracted three or more portions of the light.

In some embodiments, at least one grating coupler of the three or more grating couplers is located between two other grating couplers of the three or more grating couplers.

In some embodiments, a first other grating coupler of the two other grating couplers includes first linear grating segments oriented in a first direction.

In some embodiments, a second other grating coupler of the two other grating couplers includes second linear grating segments oriented in a second direction different from the first direction.

In some embodiments, an angle between the first direction and the second direction is in a range from 55 degrees to 65 degrees.

In some embodiments, the at least one grating coupler of the three or more grating couplers includes multiple linear grating segments oriented in a third direction different from the first direction and different from the second direction.

In some embodiments, a pitch of the at least one grating coupler of the three or more grating couplers is defined by an intersection of the first other grating coupler of the two other grating couplers and the second other grating coupler of the two other grating couplers.

In some embodiments, a width of the at least one grating coupler of the three or more grating couplers is in a range from 5 mm to 20 mm.

In some embodiments, the at least one grating coupler of the three or more grating couplers includes multiple tiles.

In some embodiments, each tile of the set tiles has a polygonal shape.

In some embodiments, each tile of the multiple tiles includes multiple protrusions. Each protrusion of the multiple protrusions has one or more sidewalls.

In some embodiments, a fill factor of a volume of each protrusion of the multiple protrusions measured along a direction of light incident on the multiple protrusions from the in-coupling grating is in a range from 10% to 90%.

In some embodiments, a pitch of an axis of the multiple protrusions is in a range from 300 nm to 450 nm.

In some embodiments, a diagonal pitch of the multiple protrusions is in a range from 300 nm to 900 nm.

In some embodiments, the at least one grating coupler of the three or more grating couplers is configured to diffuse a portion of light received from the in-coupling grating.

In some embodiments, the at least one grating coupler of the three or more grating couplers is configured to reduce an intensity of light emitted by the at least one grating coupler into an eyeball of a user of the eyepiece.

In some embodiments, an eyepiece includes an in-coupling grating patterned on at least one of a first side of having a refractive index greater than a threshold value or a second side of the substrate. A first grating coupler is patterned on the first side of the substrate and has a first grating pattern. The first grating coupler is optically coupled to the in-coupling grating. A second grating coupler is patterned on the second side of the substrate and has a second grating pattern different from the first grating pattern. The second grating coupler is optically coupled to the in-coupling grating.

In some embodiments, the first grating coupler and the second grating coupler are configured to receive light from the in-coupling grating.

In some embodiments, an area of the first grating coupler overlaps the second grating coupler, such that the overlapped area is configured to diffract a portion of the light into an eyeball of a user of the eyepiece.

In some embodiments, the area is in a range from 10% to 60% of a total area of the first grating coupler.

In some embodiments, at least one of the first grating coupler or the second grating coupler includes multiple protrusions. Each protrusion of the multiple protrusions has one or more sidewalls. Each sidewall of the one or more sidewalls is oriented at a different angle to the substrate.

In some embodiments, each protrusion of the multiple protrusions includes at least two intersecting ridges oriented in two different directions.

In some embodiments, a fill factor of a volume of each protrusion of the multiple protrusions measured along a direction of light incident on the multiple protrusions from the in-coupling grating is in a range from 10% to 90%.

In some embodiments, a pitch of an axis of the multiple protrusions is in a range from 300 nm to 450 nm.

In some embodiments, a diagonal pitch of the multiple protrusions is in a range from 300 nm to 900 nm.

In some embodiments, a height of each protrusion of the multiple protrusions is in a range from 5 nm to 500 nm.

In some embodiments, at least one of a width or a length of each protrusion of the multiple protrusions is in a range from 5 nm to 800 nm.

In some embodiments, a cross-section of each protrusion of the multiple protrusions has a triangular, sawtooth, or staircase shape.

In some embodiments, each protrusion of the multiple protrusions includes multiple cuboids. Each cuboid of the multiple cuboids has a different height.

In some embodiments, the multiple protrusions have a refractive index greater than 1.4.

In some embodiments, the first grating coupler includes tiles having the first grating pattern. The second grating coupler includes a grating area adjacent to the tiles and having the second grating pattern.

In some embodiments, the first grating coupler includes multiple recesses Each recess of the multiple recesses has one or more sidewalls. Each sidewall of the one or more sidewalls is oriented at a different angle to the substrate.

In some embodiments, the first grating coupler includes a first set of ridges oriented in a first direction. The second grating coupler includes a second set of ridges oriented in a second direction.

In some embodiments, an angle between the first direction and the second direction is in a range from 55 degrees to 65 degrees.

In some embodiments, the first grating coupler includes a first set of protrusions having a first pitch axis. The second grating coupler includes a second set of protrusions having a second pitch axis.

In some embodiments, an angle between the first pitch axis and the second pitch axis is in a range from 55 degrees to 65 degrees.

In the foregoing description, embodiments have been described with reference to numerous specific details that may vary from implementation to implementation. The description and drawings are, accordingly, to be regarded in an illustrative rather than a restrictive sense.

The invention claimed is:

1. An eyepiece comprising:
an in-coupling grating patterned on a single side of a substrate and configured to diffract light, received from a projector, into a first portion of the light and a second portion of the light,
wherein the first portion has a first orientation with respect to the light received from the projector and the second portion has a second orientation with respect to the light received from the projector, and
wherein the second orientation is different from the first orientation; and
a diffraction grating patterned on the single side of the substrate and configured to:
receive, from the in-coupling grating, the first portion of the light and the second portion of the light;
diffract the first portion of the light and the second portion of the light; and
combine the diffracted first portion of the light and the diffracted second portion of the light,
wherein the diffraction grating comprises:
a first grating coupler; and
a second grating coupler,
wherein the first grating coupler is configured to direct, to the second grating coupler, the diffracted first portion of the light, and
wherein the second grating coupler is configured to direct, to the first grating coupler, the diffracted second portion of the light.

2. The eyepiece of claim 1, wherein the first grating coupler defines an orthogonal pupil expander (OPE) of the eyepiece, and wherein the second grating coupler defines an exit pupil expander (EPE) of the eyepiece.

3. The eyepiece of claim 1, wherein the first grating coupler comprises a first plurality of ridges oriented in a first direction, and wherein the second grating coupler comprises a second plurality of ridges oriented in a second direction.

4. The eyepiece of claim 3, wherein an angle between the first direction and the second direction is in a range from 55 degrees to 65 degrees.

5. The eyepiece of claim 1, wherein the first grating coupler comprises a plurality of protrusions, each protrusion of the plurality of protrusions having one or more sidewalls, and wherein each sidewall of the one or more sidewalls is oriented at a different angle to the substrate.

6. The eyepiece of claim 1, wherein the first grating coupler comprises a plurality of recesses, each recess of the plurality of recesses having one or more sidewalls, and wherein each sidewall of the one or more sidewalls is oriented at a different angle to the substrate.

7. An eyepiece comprising:
a substrate;
an in-coupling grating patterned on a single side of the substrate and configured to diffract light, received from a projector, into a first portion of the light and a second portion of the light, wherein the first portion has a first orientation with respect to the light received from the projector and the second portion has a second orientation with respect to the light received from the projector, and wherein the second orientation is different from the first orientation;
a first grating coupler patterned on the single side of the substrate and having a first grating pattern, wherein the first grating coupler is optically coupled to the in-coupling grating; and
a second grating coupler patterned on the single side of the substrate and adjacent to the first grating coupler, the second grating coupler having a second grating pattern different from the first grating pattern, wherein the second grating coupler is optically coupled to the in-coupling grating,
wherein the in-coupling grating is configured to direct the first portion of the light into the first grating coupler and the second portion of the light into the second grating coupler.

8. The eyepiece of claim 7, wherein the first grating coupler and the second grating coupler are configured to combine the diffracted first portion of the light and the diffracted second portion of the light.

9. The eyepiece of claim 7, wherein the first grating coupler is configured to direct, to the second grating coupler, the diffracted first portion of the light.

10. The eyepiece of claim 7, wherein the first grating coupler is configured to direct, to the second grating coupler, the diffracted first portion of the light, and wherein the second grating coupler is configured to direct, to the first grating coupler, the diffracted second portion of the light.

11. The eyepiece of claim 7, wherein the first grating coupler defines an orthogonal pupil expander (OPE) of the eyepiece, and wherein the second grating coupler defines an exit pupil expander (EPE) of the eyepiece.

12. The eyepiece of claim 7, wherein the first grating coupler comprises a plurality of protrusions, each protrusion of the plurality of protrusions having one or more sidewalls, and wherein each sidewall of the one or more sidewalls is oriented at a different angle to the substrate.

13. The eyepiece of claim 12, wherein each protrusion of the plurality of protrusions comprises at least two intersecting ridges oriented in two different directions.

14. The eyepiece of claim 13, wherein an angle between the two different directions is in a range from 55 degrees to 65 degrees.

15. The eyepiece of claim 7, wherein the first grating coupler comprises a plurality of recesses, each recess of the plurality of recesses having one or more sidewalls, and wherein each sidewall of the one or more sidewalls is oriented at a different angle to the substrate.

16. A method for manufacturing an eyepiece, the method comprising:
providing a substrate;
patterning an in-coupling grating on a single side of the substrate; and patterning a diffraction grating on the single side of the substrate, wherein patterning the diffraction grating comprises:
  patterning a first grating coupler on the single side of the substrate, the first grating coupler directly optically coupled to the in-coupling grating and having a first grating pattern; and
  patterning a second grating coupler on the single side of the substrate and adjacent to the first grating coupler, wherein the second grating coupler is directly optically coupled to the in-coupling grating and has a second grating pattern different from the first grating pattern,
  wherein the patterning of the first grating coupler comprises patterning a plurality of protrusions on the single side of the substrate, each protrusion of the plurality of protrusions having one or more sidewalls, and
  wherein each sidewall of the one or more sidewalls is oriented at a different angle to the substrate.

17. A method for manufacturing an eyepiece, the method comprising:
  providing a substrate;
  patterning an in-coupling grating on a single side of the substrate; and
  patterning a diffraction grating on the single side of the substrate, wherein patterning the diffraction grating comprises:
    patterning a first grating coupler on the single side of the substrate, the first grating coupler directly optically coupled to the in-coupling grating and having a first grating pattern; and
    patterning a second grating coupler on the single side of the substrate and adjacent to the first grating coupler, wherein the second grating coupler is directly optically coupled to the in-coupling grating and has a second grating pattern different from the first grating pattern, and
    wherein the patterning of the first grating coupler further comprises patterning at least two intersecting ridges oriented in two different directions for each protrusion of a plurality of protrusions.

18. The method of claim 17, wherein an angle between the two different directions is in a range from 55 degrees to 65 degrees.

* * * * *